United States Patent
Fukui et al.

(10) Patent No.: US 11,959,194 B2
(45) Date of Patent: Apr. 16, 2024

(54) METHOD FOR PRODUCING SHORTENED ANIONICALLY MODIFIED CELLULOSE FIBERS

(71) Applicant: KAO CORPORATION, Tokyo (JP)

(72) Inventors: Shunsuke Fukui, Tokyo-to (JP);
Yutaka Yoshida, Wakayama (JP);
Kyohei Yamato, Wakayama (JP);
Junnosuke Saito, Wakayama (JP);
Takuya Morioka, Wakayama (JP);
Tadanori Yoshimura, Wakayama (JP);
Takuma Tsuboi, Wakayama (JP)

(73) Assignee: KAO CORPORATION, Tokyo (JP)

(*) Notice: Subject to any disclaimer, the term of this patent is extended or adjusted under 35 U.S.C. 154(b) by 706 days.

(21) Appl. No.: 17/052,278

(22) PCT Filed: Jun. 6, 2019

(86) PCT No.: PCT/JP2019/022460
§ 371 (c)(1),
(2) Date: Nov. 2, 2020

(87) PCT Pub. No.: WO2019/235557
PCT Pub. Date: Dec. 12, 2019

(65) Prior Publication Data
US 2021/0054541 A1 Feb. 25, 2021

(30) Foreign Application Priority Data

Jun. 8, 2018 (JP) ................. 2018-110031
Sep. 7, 2018 (JP) ................. 2018-167421

(51) Int. Cl.
| | | |
|---|---|---|
| *D01F 11/02* | (2006.01) | |
| *B33Y 70/10* | (2020.01) | |
| *D01F 2/28* | (2006.01) | |
| *D21C 1/02* | (2006.01) | |
| *D21H 11/20* | (2006.01) | |

(52) U.S. Cl.
CPC ............. *D01F 11/02* (2013.01); *B33Y 70/10* (2020.01); *D01F 2/28* (2013.01); *D21C 1/02* (2013.01); *D21H 11/20* (2013.01)

(58) Field of Classification Search
CPC ........... D01F 11/02; D01F 2/28; B33Y 70/10
See application file for complete search history.

(56) References Cited

U.S. PATENT DOCUMENTS

| | | |
|---|---|---|
| 2014/0238626 A1 | 8/2014 | Tsuji et al. |
| 2015/0027648 A1 | 1/2015 | Tsuji et al. |
| 2016/0319467 A1 | 11/2016 | Yamato et al. |
| 2016/0340827 A1 | 11/2016 | Yamato et al. |
| 2019/0127915 A1 | 5/2019 | Noguchi et al. |
| 2019/0225712 A1 | 7/2019 | Yamato et al. |

FOREIGN PATENT DOCUMENTS

| | | |
|---|---|---|
| CN | 107620211 A | 1/2018 |
| JP | 2010-235679 A | 10/2010 |
| JP | 2010-236106 A | 10/2010 |
| JP | 2010-275659 A | 12/2010 |
| JP | 2012-116059 A | 6/2012 |
| JP | 2013-185122 A | 9/2013 |
| JP | 2014-141772 A | 8/2014 |
| JP | 2014-234457 A | 12/2014 |
| JP | 2015-143336 A | 8/2015 |
| JP | 2015-221844 A | 12/2015 |
| JP | 2017-8157 A | 1/2017 |
| JP | 2018-48218 A | 3/2018 |
| JP | 2018-80336 A | 5/2018 |
| WO | WO 2013/047218 A1 | 4/2013 |
| WO | WO 2013/137140 A1 | 9/2013 |
| WO | WO 2017/078048 A1 | 5/2017 |
| WO | WO 2018/030310 A1 | 2/2018 |
| WO | WO 2018/030465 A1 | 2/2018 |
| WO | WO 2018/070387 A1 | 4/2018 |

OTHER PUBLICATIONS

Machine English translation of JP2015-143336 (2015).*
Machine English translation of WO 2018/070387 (2018).*
Chinese Office Action and Search Report for corresponding Chinese Application No. 201980035223.2, dated Jul. 27, 2022.
Japanese Office Action for Japanese Application No. 2020-523166, dated Mar. 9, 2023.

* cited by examiner

*Primary Examiner* — Jessica M Roswell
(74) *Attorney, Agent, or Firm* — Birch, Stewart, Kolasch & Birch, LLP

(57) ABSTRACT

A method for producing shortened anionically modified cellulose fibers having an average fiber length of 1 μm or more and 500 μm or less, the method including cleaving sugar chains of anionically modified cellulose fibers by thermal decomposition under temperature conditions of 50° C. or higher and 230° C. or lower, wherein the average fiber length of the anionically modified cellulose fibers is 700 μm or more and 10000 μm or less. By the use of shortened anionically modified cellulose fibers or the like obtained by the method for production of the present invention, a dispersion containing fine cellulose fibers having a low viscosity and excellent handling property can be prepared while at a high concentration, so that the dispersion can be suitably used in various industrial applications such as daily sundries, household electric appliance parts, packaging materials for household electric appliances, automobile parts, and materials for three-dimensional modeling.

22 Claims, 1 Drawing Sheet

[FIG. 1]
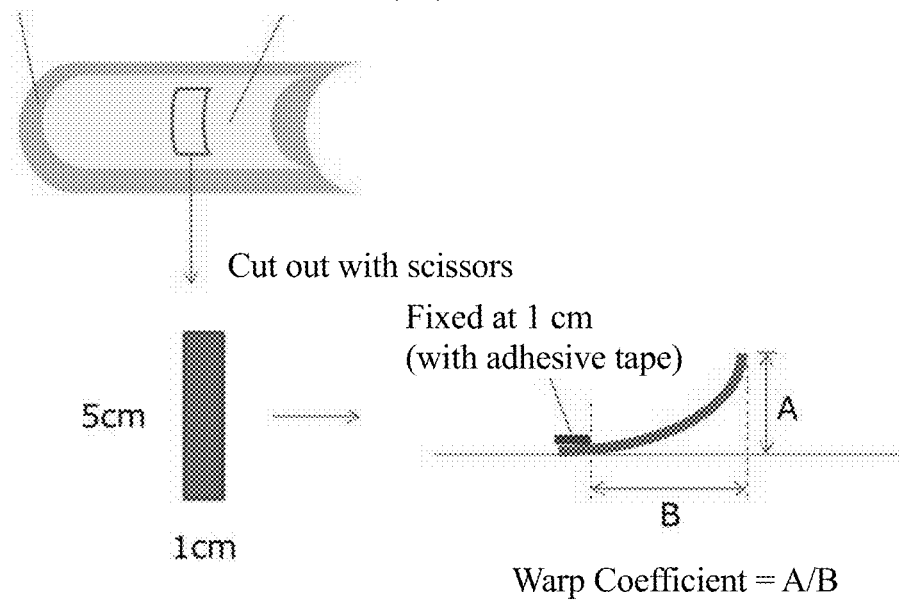
[FIG. 2]
< Optical Microscopic Image >
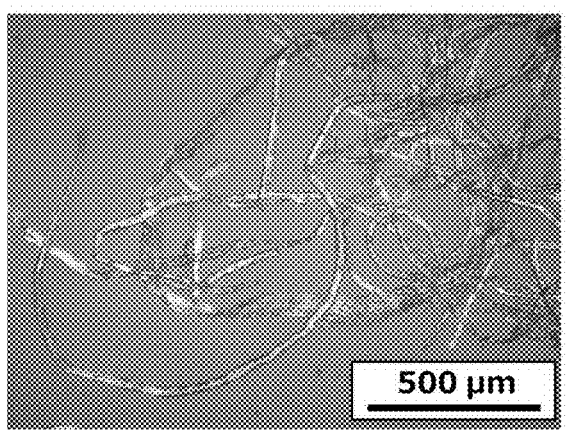
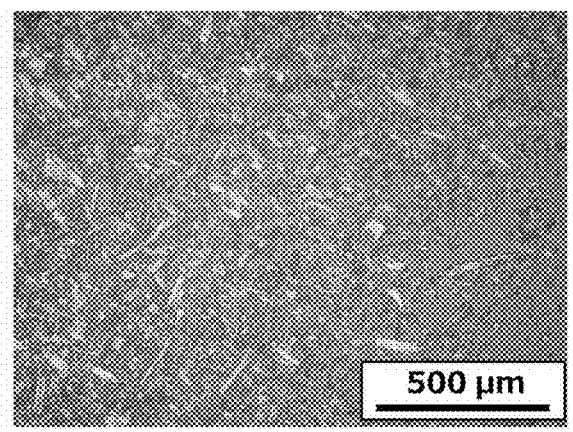
Before Hydrothermal Decomposition | After Hydrothermal Decomposition

METHOD FOR PRODUCING SHORTENED ANIONICALLY MODIFIED CELLULOSE FIBERS

FIELD OF THE INVENTION

The present invention relates to a method for producing shortened anionically modified cellulose fibers and a method for producing modified cellulose fibers using the shortened anionically modified cellulose fibers obtained by the method for production, a method for producing fine cellulose fibers, and a photo-curable composition containing cellulose fibers and/or a modified product thereof obtained by these methods for production.

BACKGROUND OF THE INVENTION

Conventionally, plastic materials derived from limited resource petroleum have been widely used; however, in the recent years, techniques with less burdens on the environment have been spotlighted. In view of the technical background, materials using cellulose fibers, which are biomass existing in nature in large amounts have been remarked.

Usually, a dispersion of fine cellulose fibers is highly viscous, so that the dispersion is drastically thickened upon mixing with a paint containing a resin, thereby making it difficult to apply the paint. For this reason, when the dispersion is used in a system as mentioned above, it is necessary to use a dispersion of fine cellulose fibers having a low viscosity.

As a method for obtaining a dispersion of fine cellulose fibers having a low viscosity, methods for shortening a fiber length of raw material cellulose fibers according to a chemical treatment with an acid, an alkali, an enzyme or the like, or according to a mechanical treatment have been known.

For example, as a method for shortening raw material cellulose fibers, Patent Publication 1 discloses a method including adding hydrochloric acid to oxidized pulp, and heating the mixture to carry out acid hydrolysis.

In addition, Patent Publication 2 discloses a method including treating oxidized pulp with a kind of an enzyme cellulase to carry out hydrolytic treatment.

Patent Publication 1: Japanese Patent Laid-Open No. 2010-275659
Patent Publication 2: Japanese Patent Laid-Open No. 2010-235679

SUMMARY OF THE INVENTION

Problems to be Solved by the Invention

However, in Patent Publication 1, corrosivity is high, and hydrochloric acid which has low handling property is used, so that there are some disadvantages in safety. In addition, in Patent Publication 2, an enzyme is used, thereby making it would be an expensive process. Therefore, a method for production which is more inexpensive and simplified is in demand.

The present invention relates to an inexpensive and simplified method for producing shortened anionically modified cellulose fibers. In addition, the present invention relates to a method for producing modified cellulose fibers using the shortened anionically modified cellulose fibers obtained by the method for production, and a method for producing fine cellulose fibers.

In addition, the present invention relates to a photo-curable composition having a low viscosity and inhibition in shrinkage during curing, and being capable of providing a high-precision three-dimensional product, a method for producing a stereolithographic product using the composition, and a stereolithographic product obtained by the method for production.

Means to Solve the Problems

The present invention relates to the following [1] to [8]:

[1] A method for producing shortened anionically modified cellulose fibers having an average fiber length of 1 μm or more and 500 μm or less, the method including cleaving sugar chains of anionically modified cellulose fibers by thermal decomposition under temperature conditions of 50° C. or higher and 230° C. or lower, wherein the average fiber length of the anionically modified cellulose fibers is 700 μm or more and 10000 μm or less.

[2] A method for producing modified cellulose fibers, including introducing a modifying group to shortened anionically modified cellulose fibers produced by a method for production as defined in [1].

[3] A method for producing fine cellulose fibers having an average fiber length of 50 nm or more and 300 nm or less, including subjecting shortened anionically modified cellulose fibers produced by a method for production as defined in [1], or modified cellulose fibers produced by a method for production as defined in [2] to a finely pulverizing treatment.

[4] A method for producing fine cellulose fibers having an average fiber length of 50 nm or more and 300 nm or less, including cleaving sugar chains of anionically modified cellulose fibers having an average fiber length of 400 nm or more and 2000 nm or less by thermal decomposition under temperature conditions of 50° C. or higher and 230° C. or lower.

[5] A photo-curable composition containing modified cellulose fibers obtained by a method as defined in [2].

[6] A photo-curable composition containing fine cellulose fibers obtained by a method as defined in [3] or [4].

[7] A method for producing a stereolithographic product, including applying a photo-curable composition as defined in [5] or [6] to a stereolithographic apparatus.

[8] A stereolithographic product obtained by a method for production as defined in [7].

Effects of the Invention

According to the present invention, an inexpensive and simplified method for producing shortened anionically modified cellulose fibers can be provided. In addition, a method for producing modified cellulose fibers using the shortened anionically modified cellulose fibers obtained by the method for production, and a method for producing fine cellulose fibers can be provided.

The photo-curable composition of the present invention exhibits an effect that its three-dimensional product obtained by curing the composition has an excellent lithographic precision, while having a low viscosity.

BRIEF DESCRIPTION OF THE DRAWINGS

FIG. 1 A view showing the outline of the measurement for a warp coefficient.

FIG. 2 Optical microphotographs showing the states of cellulose fibers before and after the thermal decomposition treatment in Example 4.

MODES FOR CARRYING OUT THE INVENTION

As a result of studying the above problems, the present inventors have found out surprisingly that fibers can be shortened without an acid, an alkali, an enzyme or the like by thermally decomposing cellulose fibers, the cellulose fibers being introduced with an anionic group. Although the mechanisms therefor are not elucidated, it is assumed that the bonds between sugar chains are more likely to be decomposed by introduction of an anionic group.

[Method for Producing Shortened Anionically Modified Cellulose Fibers]

The method for producing shortened anionically modified cellulose fibers of the present invention includes cleaving sugar chains of anionically modified cellulose fibers by thermal decomposition under temperature conditions of 50° C. or higher and 230° C. or lower (which is hereinafter also referred as "sugar chain cleaving step"). Here, the phrase "by thermal decomposition" refers to the matter that a main cause of the decomposition is decomposition which takes place under temperature conditions of 50° C. or higher and 230° C. or lower. It is considered that the main reaction of thermal decomposition in the present invention is, but not ascertained to, a decomposition reaction due to thermal energy, not a hydrolytic reaction because the decomposition progresses even in a dry state. For example, in the acid hydrolysis treatment at a temperature of from 70° C. to 120° C. described in Patent Publication 1 or the like, a main cause of decomposition is acid hydrolysis, which does not fall under a method by thermal decomposition as referred to in the present invention. Since the sugar chains of the anionically modified cellulose fibers can be cleaved by thermal decomposition according to the sugar chain cleaving step, without resorting to acid hydrolysis, alkali decomposition, or decomposition with an enzyme as conventionally known, an inexpensive and simplified method for production can be provided.

(Anionically Modified Cellulose Fibers)

As the anionically modified cellulose fibers, fibers in which an anionic group is introduced to raw material cellulose fibers can be used. The raw material cellulose fibers are preferably natural cellulose fibers, from the viewpoint of the environmental aspect, which include, for example, those from wooden pulp such as pulp from needle-leaf trees and pulp from broad-leaf trees; cotton pulp such as cotton linter and cotton lint; non-wooden pulp such as maize straw pulp and bagasse pulp; bacteria cellulose; and the like. In addition, as the anionic group, a carboxy group, a sulfonate group, and a phosphate group are preferred, and a carboxy group is more preferred, from the viewpoint of the efficiency in cleaving sugar chains. As the anionically modified cellulose fibers as described above, those obtained in the step of introducing an anionic group mentioned later may be used, or separately prepared anionically modified cellulose fibers may be used.

The ions pairing with the anionic group (counterions) in the anionically modified cellulose fibers include metal ions which are generated in the presence of an alkali during the production, such as sodium ions, potassium ions, calcium ions, and aluminum ions, onium ions such as ammonium ions and alkylammonium ions, and protons generated by replacing these metal ions with an acid. Sodium ions and protons are preferred, and protons are more preferred, from the viewpoint of the efficiency in cleaving sugar chains.

The average fiber length of the anionically modified cellulose fibers is 700 μm or more, and the average fiber length is 10000 μm or less, preferably 5000 μm or less, and more preferably 3000 μm or less. The average fiber diameter of the anionically modified cellulose fibers is preferably 5 μm or more, and preferably 500 μm or less, more preferably 300 μm or less, and even more preferably 100 μm or less. The average fiber length and the average fiber diameter of the anionically modified cellulose fibers are measured in accordance with the methods described in Examples set forth below.

The content of an anionic group of the anionically modified cellulose fibers is preferably 0.2 mmol/g or more, more preferably 0.4 mmol/g or more, even more preferably 0.6 mmol/g or more, and even more preferably 0.8 mmol/g or more, from the viewpoint of the efficiency in cleaving sugar chains. In addition, the content is preferably 3.0 mmol/g or less, more preferably 2.7 mmol/g or less, even more preferably 2.5 mmol/g or less, and even more preferably 2.0 mmol/g or less, from the viewpoint of handling property and costs. The content of an anionic group can be adjusted by, for example, a follow-up oxidization treatment or reducing treatment, or the like which is described later. Here, the term "content of an anionic group" means a total amount of anionic groups in the cellulose constituting the anionically modified cellulose fibers, which is measured in accordance with a method described in Examples set forth below.

The anionically modified cellulose fibers of the present invention may be those in which an anionic group is introduced to the raw material cellulose fibers. Here, as the method of introducing an anionic group, a known method can be used. For example, when a carboxy group is introduced, a method of oxidizing the raw material cellulose fibers together with an oxidizing agent such as sodium hypochlorite or a bromide such as sodium bromide using 2,2,6,6-tetramethyl-1-piperidine-N-oxyl (TEMPO) as a catalyst, or the like can be used. By oxidizing the raw material cellulose fibers using TEMPO as a catalyst, a group at C6 position of the cellulose constituting unit ($-CH_2OH$) is selectively converted to a carboxy group. Here, an aldehyde may be removed by further carrying out a follow-up oxidization treatment or reducing treatment, or carboxy group-containing cellulose fibers having high purity can be obtained by further carrying out a purification treatment. In addition, the method of introducing a sulfonate group includes a method of adding sulfuric acid to the raw material cellulose fibers and heating, and the like. Also, the method of introducing a phosphate group includes a method of mixing the raw material cellulose fibers which are in a dry state or a wet state with a powder or an aqueous solution of phosphoric acid or a phosphoric acid derivative; a method of adding an aqueous solution of phosphoric acid or a phosphoric acid derivative to a dispersion of the raw material cellulose fibers; and the like.

(Sugar Chain Cleaving Step)

The sugar chain cleaving step may be carried out to anionically modified cellulose fibers in a dry state, or the step may be carried out in a solvent. It is preferable that the sugar chain cleaving step is carried out in a solvent, from the viewpoint of processing efficiency. In addition, it is preferable that the sugar chain cleaving step is carried out under conditions that do not substantially contain an acid, an alkali, or an enzyme, from the viewpoint of handling property and costs. Here, the conditions that do not substantially contain an acid include the conditions in which a total amount of acids in a reaction system is preferably 0.001% by mass or less, and more preferably 0.0001% by mass or less, which embrace the conditions that contain an acid in a very small amount unintentionally admixed as impurities. The conditions that do not substantially contain an alkali include the conditions in which a total amount of alkalis in a reaction system is preferably 0.01% by mass or less, and more preferably 0.001% by mass or less, which embrace the conditions that contain an alkali in a very small amount unintentionally admixed as impurities. The conditions that do not substantially contain an enzyme include the conditions in which a total amount of enzymes in a reaction system is preferably 0.01% by mass or less, and more preferably 0.001% by mass or less, which embrace the conditions that contain an enzyme in a very small amount unintentionally admixed as impurities.

When a sugar chain cleaving step is carried out to anionically modified cellulose fibers in a dry state without a solvent, the drying method includes, but not particularly limited to, for example, spray drying, compressing, air-drying, hot-air drying, freeze drying, spray drying, vacuum drying, and the like. In addition, the water content of the anionically modified cellulose fibers in a dry state is not particularly limited.

When a sugar chain cleaving step is carried out in a solvent, the solvent to be used includes, for example, water, N,N-dimethylformamide (DMF), ethanol, isopropanol (IPA), methyl ethyl ketone (MEK), ethyl acetate, toluene, cyclohexanone, and the like, and these solvents can be used alone or in a combination of two or more kinds. Among them, a solvent containing water is preferred, from the viewpoint of handling property and costs. In the solvent containing water, the proportion of water in the solvent is preferably 50% by mass or more, more preferably 80% by mass or more, even more preferably 95% by mass or more, and even more preferably 100% by mass, from the viewpoint of handling property and costs.

The treatment liquid in the sugar chain cleaving step refers to a liquid containing anionically modified cellulose fibers and a solvent. The treatment liquid may optionally contain an inorganic salt, fine inorganic particles, fine organic particles, a surfactant, an anti-corrosive agent, or the like. The content of the anionically modified cellulose fibers in the treatment liquid in the sugar chain cleaving step is preferably 0.1% by mass or more, more preferably 1.0% by mass or more, and even more preferably 5.0% by mass or more, from the viewpoint of productivity, and the content is preferably 80% by mass or less, more preferably 60% by mass or less, and even more preferably 40% by mass or less, from the viewpoint of handling property.

The temperature in the sugar chain cleaving step is 50° C. or higher and 230° C. or lower, and the preferred temperature differs depending upon the pressure, the kinds of solvents, and the like. When the sugar chain cleaving step is carried out in a solvent, the temperature in the sugar chain cleaving step refers to a temperature of a treatment liquid. For example, when anionically modified cellulose fibers in a dry state without a solvent are treated an ambient pressure, the temperature is preferably 60° C. or higher, more preferably 70° C. or higher, even more preferably 80° C. or higher, even more preferably exceeding 80° C., and even more preferably 85° C. or higher, from the viewpoint of productivity. In addition, the temperature is preferably 220° C. or lower, more preferably 200° C. or lower, and even more preferably 170° C. or lower, from the viewpoint of the lowering of physical properties due to excessive decomposition. When a solvent is a solvent containing water at an ambient pressure, the temperature is preferably 60° C. or higher, more preferably 70° C. or higher, even more preferably 80° C. or higher, even more preferably exceeding 80° C., and even more preferably 85° C. or higher, from the viewpoint of the processing rate. In addition, the temperature is preferably 110° C. or lower, more preferably 105° C. or lower, and even more preferably 100° C. or lower, from the viewpoint of boiling point at an ambient pressure and costs.

It is preferable that the pH in the sugar chain cleaving step is 3 or more and 9 or less, from the viewpoint of wastewater treatment.

The time in the sugar chain cleaving step is preferably 4 hours or more, more preferably 6 hours or more, and even more preferably 8 hours or more, from the viewpoint of obtaining shortened anionically modified cellulose fibers. In addition, the time is preferably 2500 hours or less, more preferably 1800 hours or less, even more preferably 1200 hours or less, even more preferably 750 hours or less, even more preferably 500 hours or less, even more preferably 250 hours or less, even more preferably 100 hours or less, even more preferably 50 hours or less, and even more preferably 36 hours or less, from the viewpoint of productivity. Here, the processing time refers to the time for reaching a temperature for the treatment and maintaining the conditions of the temperature for the treatment.

The pressure in the sugar chain cleaving step is preferably 0.02 MPa or more, more preferably 0.04 MPa or more, and even more preferably 0.08 MPa or more, from the viewpoint of reducing equipment loads, and the pressure is preferably 0.25 MPa or less, more preferably 0.20 MPa or less, and even more preferably 0.12 MPa or less, from the same viewpoint.

In addition, in the method for producing shortened anionically modified cellulose fibers of the present invention, as the pretreatment step or the post-treatment step for the sugar chain cleaving step, a conventional decomposition treatment step with an acid, an alkali, an enzyme or the like can be used together, from the viewpoint of the efficiency in sugar chain cleaving, and it is preferable that the method is only composed of the sugar chain cleaving step by thermal decomposition, from the viewpoint of costs and environmental loads.

[Shortened Anionically Modified Cellulose Fibers]

Thus, shortened anionically modified cellulose fibers are obtained. The average fiber length of the shortened anionically modified cellulose fibers obtained by the method for production of the present invention is 1 μm or more, preferably 5 μm or more, and more preferably 10 μm or more, and the average fiber length is 500 μm or less, preferably 400 μm or less, and more preferably 300 μm or less. The average fiber diameter of the shortened anionically modified cellulose fibers is, but not particularly limited to, preferably 0.1 μm or more, and preferably 200 μm or less, and more preferably 100 μm or less. The average fiber length and the average fiber diameter of the shortened anionically modified cellulose fibers are measured in accordance with the methods described in Examples set forth below. In addition, the content of an anionic group of the shortened anionically modified cellulose fibers obtained by the method for production of the present invention and the counterions thereof are the same as those of the anionically modified cellulose fibers used in the sugar chain cleaving step, which can be properly modified as occasion demands.

The change rate of the average fiber length before and after the sugar chain cleaving step is preferably 60% or less, more preferably 50% or less, even more preferably 40% or less, and even more preferably 30% or less. In other words, in the present invention, a method for producing shortened anionically modified cellulose fibers in which an average fiber length of the anionically modified cellulose fibers is 60% or less, including cleaving sugar chains of the anionically modified cellulose fibers by thermal decomposition under temperature conditions of 50° C. or higher and 230° C. or lower is also provided.

The shortened anionically modified cellulose fibers have cellulose I crystal structure caused by the use of natural cellulose fibers as the raw materials. The cellulose I is a crystalline form of a natural cellulose, and the cellulose I crystallinity means a proportion of the amount of cellulose I crystalline region that occupies the entire cellulose.

The cellulose I crystallinity of the shortened anionically modified cellulose fibers is preferably 30% or more, from the viewpoint of exhibiting the mechanical properties, and the cellulose I crystallinity is preferably 95% or less, from the viewpoint of obtaining shortened anionically modified cellulose fibers. Here, the cellulose I crystallinity as used herein is specifically measured in accordance with a method described in Examples set forth below.

The shortened anionically modified cellulose fibers obtained by the method for production of the present invention are further subjected to a finely pulverizing treatment, whereby a dispersion containing fine cellulose fibers having a low viscosity and excellent handling property even at a high concentration can be prepared. Therefore, the dispersion can be suitably used in various industrial applications such as daily sundries, household electric appliance parts, packaging materials for household electric appliances, automobile parts, and materials for three-dimensional modeling. In other words, in the present invention, a method for producing fine cellulose fibers having an average fiber length of preferably 50 nm or more and 300 nm or less, including subjecting shortened anionically modified cellulose fibers or modified cellulose fibers described later to a finely pulverizing treatment is also provided.

[Method for Producing Fine Cellulose Fibers]

The shortened anionically modified cellulose fibers obtained by the method for production of the present invention can be further optionally subjected to a finely pulverizing treatment, so that the cellulose fibers can be used as fine cellulose fibers of nano-scale (nanofibers). The further finely pulverizing treatment includes mechanical finely pulverizing treatments with a disintegrator, a beating machine, a low-pressure homogenizer, a high-pressure homogenizer, a grinder, a cutter mill, a ball-mill, a jet mill, a short shaft extruder, a twin-screw extruder, an ultrasonic agitator, a juice mixer for households, or the like.

When the shortened anionically modified cellulose fibers obtained by the method for production of the present invention are formed into nanofibers, the fibers can be provided with a lower aspect ratio, in the same manner as in the conventional fine cellulose fibers obtained through a hydrolysis treatment with an acid, an alkali, an enzyme or the like, whereby a dispersion having a low viscosity can be obtained. As the fine cellulose fibers as mentioned above, the average fiber length is preferably 50 nm or more and 300 nm or less, the average fiber diameter is preferably 2 nm or more and 10 nm or less, and the average aspect ratio (average fiber length/average fiber diameter) is preferably 5 or more, and more preferably 20 or more, and preferably 150 or less, and more preferably 100 or less, from the viewpoint of obtaining a dispersion having a low viscosity. The average fiber length, the average fiber diameter, and the average aspect ratio of the fine cellulose fibers as mentioned above can be measured with an atomic force microscope (AFM), Nanoscope III Tapping mode AFM, manufactured by Digital Instrument, a probe used being Point Probe (NCH) manufactured by NANOSENSORS.

Other production embodiments for the fine cellulose fibers in the present invention include an embodiment including subjecting anionically modified cellulose as a raw material which is previously formed into nanofibers to a shortening treatment by thermal decomposition. More specifically, the embodiment includes a method for producing fine cellulose fibers having an average fiber length of 50 nm or more and 300 nm or less, including cleaving sugar chains of anionically modified cellulose fibers having an average fiber length of 400 nm or more and 2000 nm or less by thermal decomposition under temperature conditions of 50° C. or higher and 230° C. or lower. Here, the raw material anionically modified cellulose fibers which are previously formed into nanofibers can be prepared by a known method.

[Method for Producing Modified Cellulose Fibers]

In addition, the shortened anionically modified cellulose fibers obtained by the method for production of the present invention can be further optionally modified with a modifying group and used. A method for producing modified cellulose fibers using the shortened anionically modified cellulose fibers obtained by the method for production of the present invention will be explained hereinbelow.

The method for producing modified cellulose fibers of the present invention includes introducing a modifying group to shortened anionically modified cellulose fibers. Here, optionally, the fibers before or after the step of introducing a modifying group are dispersed in a solvent to carry out a mechanical finely pulverizing treatment, whereby fine modified cellulose fibers can also be produced.

The step of introducing a modifying group can be carried out by a known method, and as a compound for modification, an appropriate compound may be selected in accordance with the binding form with an anionic group or a hydroxyl group.

For example, when the binding form is an ionic bonding, the compound for modification includes primary amines, secondary amines, tertiary amines, quaternary ammonium compounds, phosphonium compounds, and the like. These compounds may be compounds having as a modifying group various hydrocarbon groups, including, for example, hydrocarbon groups such as acyclic saturated hydrocarbon groups, acyclic unsaturated hydrocarbon groups, cyclic saturated hydrocarbon groups, and aromatic hydrocarbon groups, or a copolymer moiety or the like. The compounds for modification may be introduced alone or in a combination of two or more kinds.

When the binding form is covalent bonding, an appropriate compound for modification is used in accordance with the matter that an anionic group is modified, or a hydroxyl group is modified. When the anionic group is modified, for example, when the anionic group is modified via an amide bonding, it is preferable to use, for example, primary amines and secondary amines as a compound for modification. When the anionic group is modified via an ester bonding, it is preferable to use, for example, an alcohol such as butanol, octanol, and dodecanol as a compound for modification. When the anionic group is modified via a urethane bonding, it is preferable to use, for example, an isocyanate compound as a compound for modification. These compounds can be introduced as a modifying group with various hydrocarbon groups, including, for example, hydrocarbon groups such as acyclic saturated hydrocarbon groups, acyclic unsaturated hydrocarbon groups, cyclic saturated hydrocarbon groups, and aromatic hydrocarbon groups, or a copolymer moiety or the like. These groups or moieties may be introduced alone or in a combination of two or more kinds.

When a hydroxyl group is modified, for example, when a hydroxyl group is modified via an ester bonding, it is preferable to use, for example, an acid anhydride (e.g., acetic anhydride, propionic anhydride), or an acid halide (e.g., caprylic acid chloride, lauric acid chloride, and stearic acid chloride) as a compound for modification. When a hydroxyl group is modified via an ether bonding, preferred are, for example, epoxy compounds (e.g., alkylene oxides and alkyl glycidyl ethers), alkyl halides and derivatives thereof (e.g., methyl chloride, ethyl chloride, and octadecyl chloride) as a compound for modification. When a hydroxyl group is modified via a urethane bonding, it is preferable to use, for example, an isocyanate compound as a compound for modification. These compounds can be introduced as a modifying group with various hydrocarbon groups, including, for example, hydrocarbon groups such as acyclic saturated hydrocarbon groups, acyclic unsaturated hydrocarbon groups, cyclic saturated hydrocarbon groups, and aromatic hydrocarbon groups, or a copolymer moiety or the like. These groups or moieties may be introduced alone or in a combination of two or more kinds.

A preferred method of use of the shortened fine cellulose fibers obtained by the method for production of the present invention (also simply referred to as "fine cellulose fibers") or the fine cellulose fibers that are subjected to a further modification thereof (also referred to "fine cellulose fiber composite") includes an embodiment of blending to a photo-curable composition described later. A preferred embodiment in a case where those fine cellulose fibers are used as a photo-curable composition will be explained hereinbelow.

(Amine Having Modifying Group)

The amine having a modifying group in the fine cellulose fiber composite may be any amines so long as the amine has a modifying group described later. In the case of an ionic bonding, the amine may be any one of primary amines, secondary amines, tertiary amines, and quaternary ammonium cations. From the viewpoint of the reactivities, the primary amine, the secondary amine, or the quaternary ammonium cation is preferred, the primary amine or the quaternary ammonium cation is more preferred, and the primary amine is even more preferred. In the case of an amide bonding, the amine may be any one of primary amines and secondary amines, and the primary amines are preferred, from the viewpoint of the reactivities.

As the modifying group in the present invention, a hydrocarbon group, an ethylene oxide/propylene oxide (EO/PO) copolymer moiety or the like can be used, from the viewpoint of inhibiting the shrinkage during curing. These modifying groups may be introduced to the fine cellulose fibers, alone or in a combination of two or more kinds.

The hydrocarbon group includes, for example, acyclic saturated hydrocarbon groups, acyclic unsaturated hydrocarbon groups, cyclic saturated hydrocarbon groups, and aromatic hydrocarbon groups. Acyclic saturated hydrocarbon groups, cyclic saturated hydrocarbon groups, and aromatic hydrocarbon groups are preferred, from the viewpoint of inhibition of side reactions and from the viewpoint of safety.

The acyclic saturated hydrocarbon group may be linear or branched. The number of carbon atoms of the acyclic saturated hydrocarbon group is preferably 1 or more, more preferably 2 or more, and even more preferably 3 or more, from the viewpoint of inhibiting the shrinkage during curing. In addition, the number of carbon atoms is preferably 30 or less, and more preferably 18 or less, from the same viewpoint.

Specific examples of the acyclic saturated hydrocarbon group include, for example, a methyl group, an ethyl group, a propyl group, an isopropyl group, a butyl group, a sec-butyl group, a tert-butyl group, an isobutyl group, a pentyl group, a tert-pentyl group, an isopentyl group, a hexyl group, an isohexyl group, a heptyl group, an octyl group, a 2-ethylhexyl group, a nonyl group, a decyl group, a dodecyl group, a tridecyl group, a tetradecyl group, an octadecyl group, a docosyl group, an octacosanyl group, and the like. From the viewpoint of inhibiting the shrinkage during curing, preferred are a propyl group, an isopropyl group, a butyl group, a sec-butyl group, a tert-butyl group, an isobutyl group, a pentyl group, a tert-pentyl group, an isopentyl group, a hexyl group, an isohexyl group, a heptyl group, an octyl group, a 2-ethylhexyl group, a nonyl group, a decyl group, a dodecyl group, a tridecyl group, a tetradecyl group, an octadecyl group, a docosyl group, and an octacosanyl group, and more preferred are a propyl group, an isopropyl group, a butyl group, a sec-butyl group, a tert-butyl group, an isobutyl group, a pentyl group, a tert-pentyl group, an isopentyl group, a hexyl group, an isohexyl group, a heptyl group, an octyl group, a 2-ethylhexyl group, a nonyl group, a decyl group, a dodecyl group, a tridecyl group, a tetradecyl group, and an octadecyl group. These groups may be each introduced alone or in any proportions of two or more kinds.

The acyclic unsaturated hydrocarbon group may be linear or branched. The number of carbon atoms of the acyclic unsaturated hydrocarbon group is preferably 1 or more, more preferably 2 or more, and even more preferably 3 or more, from the viewpoint of the lowering of viscosities. In addition, the number of carbon atoms is preferably 30 or less, and more preferably 18 or less, from the viewpoint of easy availability.

Specific examples of the acyclic unsaturated hydrocarbon group include, for example, an ethylene group, a propylene group, a butene group, an isobutene group, an isoprene group, a pentene group, a hexene group, a heptene group, an octene group, a nonene group, a decene group, a dodecene group, a tridecene group, a tetradecene group, and an octadecene group. From the viewpoint of the affinity with the precursor, preferred are an ethylene group, a propylene group, a butene group, an isobutene group, an isoprene group, a pentene group, a hexene group, a heptene group, an octene group, a nonene group, a decene group, and a dodecene group, and more preferred are a hexene group, a heptene group, an octene group, a nonene group, a decene group, and a dodecene group. These groups may be each introduced alone or in any proportions of two or more kinds.

The number of carbon atoms of the cyclic saturated hydrocarbon group is preferably 3 or more, more preferably 4 or more, and even more preferably 5 or more, from the viewpoint of the lowering of viscosities. In addition, the number of carbon atoms is preferably 20 or less, and more preferably 16 or less, from the viewpoint of easy availability.

Specific examples of the cyclic saturated hydrocarbon group include, for example, a cyclopropane group, a cyclobutyl group, a cyclopentane group, a cyclohexyl group, a cycloheptyl group, a cyclooctyl group, a cyclononyl group, a cyclodecyl group, a cyclododecyl group, a cyclotridecyl group, a cyclotetradecyl group, a cyclooctadecyl group, and the like. From the viewpoint of the affinity with the precursor, preferred are a cyclopropane group, a cyclobutyl group, a cyclopentane group, a cyclohexyl group, a cycloheptyl group, a cyclooctyl group, a cyclononyl group, a cyclodecyl group, and a cyclododecyl group, and more preferred are a cyclohexyl group, a cycloheptyl group, a cyclooctyl group, a cyclononyl group, a cyclodecyl group, and a cyclododecyl group. These groups may be each introduced alone or in any proportions of two or more kinds.

The aromatic hydrocarbon groups are, for example, selected from the group consisting of aryl groups and aralkyl groups. As the aryl groups and the aralkyl groups, those groups in which the aromatic ring moiety itself is substituted or unsubstituted may be used.

A total number of carbon atoms of the above aryl group may be 6 or more, and a total number of carbon atoms is preferably 24 or less, more preferably 20 or less, even more preferably 14 or less, even more preferably 12 or less, and even more preferably 10 or less, from the viewpoint of the affinity with the precursor.

A total number of carbon atoms of the above aralkyl group is 7 or more, and a total number of carbon atoms is preferably 8 or more, from the viewpoint of the affinity with the precursor. Also, a total number of carbon atoms is preferably 24 or less, more preferably 20 or less, even more preferably 14 or less, even more preferably 13 or less, and even more preferably 11 or less, from the same viewpoint.

The aryl group includes, for example, a phenyl group, a naphthyl group, an anthryl group, a phenanthryl group, a biphenyl group, a triphenyl group, a terphenyl group, and groups in which these groups are substituted with a substituent given later, and these aryl groups may be each introduced alone or in a given proportion of two or more kinds. Among them, a phenyl group, a biphenyl group, and a terphenyl group are preferred, and a phenyl group is more preferred, from the viewpoint of the affinity with the precursor.

The aralkyl group includes, for example, a benzyl group, a phenethyl group, a phenylpropyl group, a phenylpentyl group, a phenylhexyl group, a phenylheptyl group, a phenyloctyl group, and groups in which an aromatic group of these groups is substituted with a substituent given later, and these aralkyl groups may be each introduced alone or in a given proportion of two or more kinds. Among them, a benzyl group, a phenethyl group, a phenylpropyl group, a phenylpentyl group, a phenylhexyl group, and a phenylheptyl group are preferred, a benzyl group, a phenethyl group, a phenylpropyl group, a phenylpentyl group, and a phenylhexyl group are more preferred, and a benzyl group, a phenethyl group, a phenylpropyl group, and a phenylpentyl group are even more preferred, from the viewpoint of the affinity with the precursor.

The amine having the above hydrocarbon group can be prepared in accordance with a known method. Also, a commercially available product may be used. As the amine having an acyclic saturated hydrocarbon group, for example, propylamine, isopropylamine, butylamine, sec-butylamine, tert-butylamine, isobutylamine, pentylamine, tert-pentylamine, isopentylamine, hexylamine, isohexylamine, heptylamine, octylamine, 2-ethylhexylamine, nonylamine, decylamine, dodecylamine, tridecylamine, tetradecylamine, octadecylamine, docosylamine, or octacosanylamine can be used. As the amine having an acyclic unsaturated hydrocarbon group, ethyleneamine, propyleneamine, buteneamine, isobuteneamine, isopreneamine, penteneamine, hexeneamine, hepteneamine, octeneamine, noneneamine, deceneamine, or dodeceneamine can be used. As the amine having a cyclic saturated hydrocarbon group, cyclopropanamine, cyclobutylamine, cyclopentanamine, cyclohexylamine, cycloheptylamine, cyclooctylamine, cyclononylamine, cyclodecylamine, or cyclododecylamine can be used. As the amine having an aromatic hydrocarbon group, for example, aniline, 4-biphenylamine, diphenylamine, 2-aminonaphthalene, p-terphenylamine, 2-aminoanthracene, 2-aminoanthraquinone, benzylamine, phenethylamine, 3-phenylpropylamine, 5-phenylpentylamine, 6-phenylhexylamine, 7-phenylheptylamine, or 8-phenyloctylamine can be used. In addition, as the quaternary alkylammonium cations, for example, tetramethylammonium hydroxide, tetraethylammonium hydroxide, tetraethylammonium chloride, tetrabutylammonium hydroxide, tetrapropylammonium hydroxide, tetrabutylammonium chloride, lauryltrimethylammonium chloride, dilauryldimethylammonium chloride, stearyltrimethylammonium chloride, distearyldimethylammonium chloride, cetyltrimethylammonium chloride, or alkylbenzyldimethylammonium chlorides can be used.

As to the acyclic saturated hydrocarbon group, the acyclic unsaturated hydrocarbon group, and the cyclic saturated hydrocarbon group, the average binding amount, mmol/g, of the hydrocarbon group in the fine cellulose fiber composite, based on the above fine cellulose fibers, is preferably 0.001 mmol/g or more, more preferably 0.005 mmol/g or more, and even more preferably 0.01 mmol/g or more, from the aspect of facilitating the control of the binding amount of the hydrocarbon group. In addition, the average binding amount is preferably 3 mmol/g or less, and more preferably 2 mmol/g or less, from the viewpoint of the reactivities. In addition, as to the aromatic hydrocarbon group, the average binding amount of the hydrocarbon group is preferably 0.1 mmol/g or more, more preferably 0.2 mmol/g or more, and even more preferably 0.5 mmol/g or more, from the viewpoint of inhibiting the shrinkage during curing. Also, the average binding amount is preferably 3 mmol/g or less, more preferably 2 mmol/g or less, and even more preferably 1.5 mmol/g or less, from the viewpoint of the reactivities. Here, even in a case where a hydrocarbon group selected from the acyclic saturated hydrocarbon groups, acyclic unsaturated hydrocarbon groups, and cyclic saturated hydrocarbon groups, and an aromatic hydrocarbon group are concurrently introduced, it is preferable that the individual average binding amounts are within the range defined above.

Also, as to the acyclic saturated hydrocarbon group, the acyclic unsaturated hydrocarbon group, and the cyclic saturated hydrocarbon group, the average binding amount, parts by mass, of the hydrocarbon group in the fine cellulose fiber composite, based on 100 parts by mass of the above fine cellulose fibers, is preferably 10 parts by mass or more, more preferably 15 parts by mass or more, and even more preferably 20 parts by mass or more, from the aspect of facilitating the control of the binding amount of the hydrocarbon group. In addition, the average binding amount is preferably 50 parts by mass or less, more preferably 45 parts by mass or less, and even more preferably 40 parts by mass or less, from the viewpoint of the reactivities. In addition, as to the aromatic hydrocarbon group, the average binding amount of the hydrocarbon group is preferably 5 parts by mass or more, and more preferably 10 parts by mass or more, from the viewpoint of inhibiting the shrinkage during curing. Also, the average binding amount is preferably 40 parts by mass or less, more preferably 35 parts by mass or less, and even more preferably 30 parts by mass or less, from the viewpoint of the reactivities. Here, even in a case where a hydrocarbon group selected from the acyclic saturated hydrocarbon groups, acyclic unsaturated hydrocarbon groups, and cyclic saturated hydrocarbon groups, and an aromatic hydrocarbon group are concurrently introduced, it is preferable that the individual average binding amounts are within the range defined above.

Also, likewise, as to the acyclic saturated hydrocarbon group, the acyclic unsaturated hydrocarbon group, and the cyclic saturated hydrocarbon group, the average binding amount, % by mass, of the hydrocarbon group in the fine cellulose fiber composite is preferably 10% by mass or more, more preferably 15% by mass or more, and even more preferably 20% by mass or more, from the aspect of facilitating the control of the binding amount of the hydrocarbon group. In addition, the average binding amount is preferably 50% by mass or less, more preferably 45% by mass or less, and even more preferably 40% by mass or less, from the viewpoint of the reactivities. In addition, as to the aromatic hydrocarbon group, the average binding amount of the hydrocarbon group is preferably 5% by mass or more, and more preferably 10% by mass or more, from the viewpoint of inhibiting the shrinkage during curing. Also, the average binding amount is preferably 40% by mass or less, more preferably 35% by mass or less, and even more preferably 30% by mass or less, from the viewpoint of the reactivities. Here, even in a case where a hydrocarbon group selected from the acyclic saturated hydrocarbon groups, acyclic unsaturated hydrocarbon groups, and cyclic saturated hydrocarbon groups, and an aromatic hydrocarbon group are concurrently introduced, it is preferable that the individual average binding amounts are within the range defined above.

In addition, as to the acyclic saturated hydrocarbon group, the acyclic unsaturated hydrocarbon group, and the cyclic saturated hydrocarbon group, the introduction ratio of the hydrocarbon group is preferably 10% or more, more preferably 30% or more, even more preferably 50% or more, even more preferably 60% or more, and even more preferably 70% or more, from the viewpoint of inhibiting the shrinkage during curing, and the introduction ratio is preferably 99% or less, more preferably 97% or less, even more preferably 95% or less, and even more preferably 90% or less, from the viewpoint of the reactivities. In addition, as to the aromatic hydrocarbon group, the introduction ratio of the hydrocarbon group is preferably 10% or more, more preferably 30% or more, even more preferably 50% or more, even more preferably 60% or more, even more preferably 70% or more, and even more preferably 80% or more, from the viewpoint of obtaining a three-dimensional product having an excellent three-dimensional precision, and the introduction ratio is preferably 99% or less, more preferably 97% or less, even more preferably 95% or less, and even more preferably 90% or less, from the viewpoint of the reactivities. Here, in a case where a hydrocarbon group selected from the acyclic saturated hydrocarbon groups, acyclic unsaturated hydrocarbon groups, and cyclic saturated hydrocarbon groups, and an aromatic hydrocarbon group are concurrently introduced, it is preferable that a total of the introduction ratios is within the range defined above not exceeding the upper limit 100%.

The EO/PO copolymer moiety means a structure in which ethylene oxides (EO) and propylene oxides (PO) are polymerized in a random or block form. For example, in a case where the amine having an EO/PO copolymer moiety is represented by the formula (i) mentioned later, ethylene oxides (EO) and propylene oxides (PO) have a chained structure in a random or block form.

The content ratio of PO, % by mol, in the EO/PO copolymer moiety is preferably 1% by mol or more, more preferably 5% by mol or more, even more preferably 7% by mol or more, and even more preferably 10% by mol or more, from the viewpoint of inhibiting the shrinkage during curing. The content ratio is preferably 100% by mol or less, more preferably 90% by mol or less, even more preferably 85% by mol or less, even more preferably 75% by mol or less, even more preferably 60% by mol or less, even more preferably 50% by mol or less, even more preferably 40% by mol or less, and even more preferably 30% by mol or less, from the same viewpoint. Here, the content ratio of PO of 100% by mol refers that the EO/PO copolymer moiety is constituted by PO alone, and it is acceptable that a PO polymer moiety is introduced in the present invention.

The molecular weight of the EO/PO copolymer moiety is preferably 700 or more, more preferably 1,000 or more, and even more preferably 1,500 or more, from the viewpoint of dispersibility in the precursor, and inhibition of the shrinkage during curing, and the molecular weight is preferably 10,000 or less, more preferably 7,000 or less, even more preferably 5,000 or less, even more preferably 4,000 or less, even more preferably 3,500 or less, and even more preferably 2,500 or less, from the viewpoint of inhibiting the shrinkage during curing. The content ratio of PO, % by mol, of the EO/PO copolymer moiety and the molecular weight of the EO/PO copolymer moiety can be obtained by calculating from an average number of moles added when an amine is produced.

It is preferable that the EO/PO copolymer moiety and the amine are bound directly or via a linking group. As the linking group, a hydrocarbon group is preferred, and an alkylene group having the number of carbon atoms of preferably from 1 to 6, and more preferably from 1 to 3, is used. For example, an ethylene group or a propylene group is preferred.

The amine having an EO/PO copolymer moiety includes, for example, a compound represented by the following formula (i):

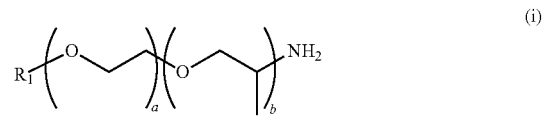

(i)

wherein $R_1$ is a hydrogen atom, a linear or branched alkyl group having from 1 to 6 carbon atoms, or a —$CH_2CH(CH_3)NH_2$ group, in which EO and PO are present in a random or block form; a is a positive number showing an average number of moles of EO added; and b is a positive number showing an average number of moles of PO added.

a in the formula (i) shows an average number of moles of EO added, and it is preferably 11 or more, more preferably 15 or more, even more preferably 20 or more, even more preferably 25 or more, and even more preferably 30 or more, from the viewpoint of inhibiting the shrinkage during curing, and it is preferably 100 or less, more preferably 70 or less, even more preferably 60 or less, even more preferably 50 or less, and even more preferably 40 or less, from the same viewpoint.

b in the formula (i) shows an average number of moles of PO added, and it is preferably 1 or more, more preferably 2 or more, and even more preferably 3 or more, from the viewpoint of inhibiting the shrinkage during curing, and it is preferably 50 or less, more preferably 40 or less, even more preferably 30 or less, even more preferably 25 or less, even more preferably 20 or less, and even more preferably 15 or less, from the same viewpoint.

In addition, as to the content ratio of PO, % by mol, in the EO/PO copolymer moiety, when an amine is represented by the formula (i) defined above, the content ratio of PO in the copolymer moiety can be calculated from a and b mentioned above, which can be obtained by the formula: b×100/(a+b). The preferred range is as mentioned above.

$R_1$ in the formula (i) is a hydrogen atom, a linear or branched alkyl group having from 1 to 6 carbon atoms, or a —$CH_2CH(CH_3)NH_2$ group. It is preferable that $R_1$ is a hydrogen atom, from the viewpoint of inhibiting the shrinkage during curing. The linear or branched alkyl group having from 1 to 6 carbon atoms is preferably a methyl group, an ethyl group, and an iso- or normal-propyl group.

The amine having an EO/PO copolymer moiety represented by the formula (i) can be prepared in accordance with a known method. For example, ethylene oxides and propylene oxides may be added in desired amounts to a propylene glycol alkyl ether, and thereafter a hydroxyl group terminal may be formed into an amino group. The alkyl ether can be opened with an acid as needed so as to have a hydrogen atom at a terminal. For these production methods, a reference can be made to Japanese Patent Laid-Open No. Hei-3-181448.

Also, a commercially available product can be suitably used, and specific examples include Jeffamine M-2070, Jeffamine M-2005, Jeffamine M-1000, Surfoamine B200, Surfoamine L100, Surfoamine L200, Surfoamine L207, Surfoamine L300, XTJ-501, XTJ-506, XTJ-507, XTJ-508, Jeffamine ED-900, Jeffamine ED-2003, Jeffamine D-2000, Jeffamine D-4000, XTJ-510, Jeffamine T-3000, Jeffamine T-5000, XTJ-502, XTJ-509, XTJ-510, manufactured by HUNTSMAN, and the like. These may be used alone or in a combination of two or more kinds.

The average binding amount, mmol/g, of the EO/PO copolymer moiety in the fine cellulose fiber composite is preferably 0.01 mmol/g or more, more preferably 0.05 mmol/g or more, even more preferably 0.1 mmol/g or more, even more preferably 0.3 mmol/g or more, even more preferably 0.5 mmol/g or more, even more preferably 0.8 mmol/g or more, and even more preferably 1 mmol/g or more, from the viewpoint of inhibiting the shrinkage during curing. In addition, the average binding amount is preferably 3 mmol/g or less, more preferably 2 mmol/g or less, and even more preferably 1.5 mmol/g or less, from the viewpoint of the lowering of viscosities and the reactivities.

The average binding amount, parts by mass, of the EO/PO copolymer moiety in the fine cellulose fiber composite, based on 100 parts by mass of the above fine cellulose fibers, is preferably 5 parts by mass or more, more preferably 10 parts by mass or more, and even more preferably 20 parts by mass or more, from the viewpoint of inhibiting the shrinkage during curing. In addition, the average binding amount is preferably 500 parts by mass or less, more preferably 400 parts by mass or less, and even more preferably 300 parts by mass or less, from the viewpoint of the lowering of viscosities and the reactivities.

The average binding amount, % by mass, of the EO/PO copolymer moiety in the fine cellulose fiber composite is preferably 5% by mass or more, more preferably 10% by mass or more, and even more preferably 20% by mass or more, from the viewpoint of inhibiting the shrinkage during curing. In addition, the average binding amount is preferably 85% by mass or less, more preferably 80% by mass or less, and even more preferably 75% by mass or less, from the viewpoint of the lowering of viscosities and the reactivities.

In addition, the introduction ratio of the EO/PO copolymer moiety in the fine cellulose fiber composite is preferably 10% or more, more preferably 20% or more, even more preferably 30% or more, even more preferably 40% or more, even more preferably 50% or more, even more preferably 60% or more, even more preferably 70% or more, even more preferably 80% or more, from the viewpoint of inhibiting the shrinkage during curing, and the introduction ratio is preferably 95% or less, from the same viewpoint.

Here, the above modifying group may have a substituent. For example, it is preferable that a total number of carbons of an overall modifying group including a substituent is within the range defined above. The substituent includes, for example, alkoxy groups having from 1 to 6 carbon atoms, such as a methoxy group, an ethoxy group, a propoxy group, an isopropoxy group, a butoxy group, an isobutoxy group, a sec-butoxy group, a tert-butoxy group, a pentyloxy group, an isopentyloxy group, and a hexyloxy group; alkoxycarbonyl groups of which alkoxy group has from 1 to 6 carbon atoms, such as a methoxycarbonyl group, an ethoxycarbonyl group, a propoxycarbonyl group, an isopropoxycarbonyl group, a butoxycarbonyl group, an isobutoxycarbonyl group, a sec-butoxycarbonyl group, a tert-butoxycarbonyl group, a pentyloxycarbonyl group, and an isopentyloxycarbonyl group; halogen atoms such as a fluorine atom, a chlorine atom, a bromine atom, and an iodine atom; acyl groups having from 1 to 6 carbon atoms such as an acetyl group and a propionyl group; aralkyl groups; aralkyloxy groups; alkylamino groups having from 1 to 6 carbon atoms; and dialkylamino groups of which alkyl group has from 1 to 6 carbon atoms. Here, the hydrocarbon group mentioned above itself may be bonded as a substituent.

The average binding amount of the modifying group as used herein can be adjusted by an amount of an amine, the kinds of an amine, a reaction temperature, a reaction time, a solvent, or the like. In addition, the average binding amounts, mmol/g, parts by mass, and % by mass, and the introduction ratio, %, of the modifying group in the fine cellulose fiber composite are an amount and a proportion of the modifying group introduced to a carboxy group on the surface of the fine cellulose fibers, and the content of carboxy group of the fine cellulose fibers can be calculated in accordance with a known method (for example, titration, IR determination, or the like).

[Photo-Curable Composition]

Preferred methods of use of the shortened fine cellulose fibers obtained by the method for production of the present invention and the fine cellulose fibers which are further modified thereto include an embodiment of blending with a photo-curable composition. For example, a photo-curable composition has the features of containing fine cellulose fibers and/or a modified product thereof satisfying A) being a photo-curable resin precursor, and B) having an average aspect ratio of preferably 100 or less, and a content of an anionic group of 0.1 mmol/g or more. The composition as used herein may be also described as a resin composition of the present invention.

In general, when blending components of resin precursors are changed, a curable resin composition is likely to fluctuate the physical properties of not only a composition before curing, but also the curing rate, the shrinkage during curing, and the three-dimensional modeling product itself after curing, so that it is not easy to adjust the kinds and the amounts of the resin precursor in order to give the desired physical properties to each of a composition before curing and a three-dimensional modeling product.

On the other hand, conventionally, a polymer material has been used in order to adjust the thickening property and dispersion stability of the composition. However, a curable resin composition blended with a conventional polymer material was not satisfactory in inhibition of the shrinkage during curing. In view of the above, in the present invention, it has been found out that the shrinkage of the three-dimensional modeling product during curing can be inhibited while keeping the thickening property of a composition before curing low, by adding particular fine cellulose fibers and/or a modified product thereof to a system containing a photo-curable resin precursor. Although the detailed reasons are not ascertained, it is assumed as follows. The fine cellulose fibers which are shortened (low aspect ratio) are dispersed, whereby improving dispersibility in the resin and facilitating the adjustment of viscosities, and the fine cellulose fibers themselves exhibit a tangling strength of the fibers themselves, thereby making it possible to inhibit the shrinkage during curing. The phrase "inhibiting (inhibition of) the shrinkage during curing" as used herein means the properties that are evaluated by "a warp coefficient" mentioned later.

[Photo-Curable Resin Precursor]

The photo-curable resin precursor in the present invention is not particularly limited, so long as the polymerization reaction is allowed to progress by irradiation of active energy rays such as ultraviolet rays or electron beams, optionally using a photopolymerization initiator. For example, a monomer (monofunctional monomer, polyfunctional monomer), or an oligomer or resin having a reactive unsaturated group, or the like can be used.

The monofunctional monomer includes, for example, (meth)acrylic monomers such as (meth)acrylic acid esters; vinyl-based monomers such as vinyl pyrrolidone; (meth)acrylates having a bridged cyclohydrocarbon group such as isobornyl (meth)acrylate and adamantyl (meth)acrylate; and the like. The polyfunctional monomer contains a polyfunctional monomer having 2 to 8 or so polymerizable groups, and the bifunctional monomer includes, for example, di(meth)acrylates having a bridged cyclohydrocarbon group such as ethylene glycol di(meth)acrylate and propylene glycol di(meth)acrylate, and the like. The tri- to octo-functional monomer includes, for example, glycerol tri(meth)acrylate, and the like. In the present invention, (meth)acrylate includes the methacrylic acid compounds and the acrylic acid compounds.

As the oligomer or resin having a reactive unsaturated group, (meth)acrylates of alkylene oxide adducts of bisphenol A, epoxy (meth)acrylates (bisphenol A type epoxy (meth)acrylate, novolak type epoxy (meth)acrylate, etc.), polyester (meth)acrylates (e.g., aliphatic polyester-type (meth)acrylates, aromatic polyester-type (meth)acrylates, etc.), urethane (meth)acrylates (polyester-type urethane (meth)acrylates, polyether-type urethane (meth)acrylates, etc.), silicone (meth)acrylates, and the like can be exemplified, among which one or more members selected from the group consisting of (meth)acrylic resins and epoxy-based resins are preferred. These oligomers or resins may be used together with the above monomer.

The photo-curable resin precursor can be used alone or in a combination of two or more kinds. When combined, its composition can be properly adjusted.

In addition, as to the photo-curable resin precursor, those prepared in accordance with a known method may be used, or a commercially available product may be used. In the present invention, as the preferred commercially available products, for example, OBJET FULLCURE 720 (acrylic acid-based resin, manufactured by Stratacys), SCR774, SCR11120, SCR780, SCR780C (each of the above is an epoxy-based resin, manufactured by D-MEC Ltd.), or AR-M2 (an acrylic resin, manufactured by KEYENCE) can be used.

The content of each of the components in the resin composition of the present invention is as follows.

The content of the photo-curable resin precursor in the resin composition of the present invention is preferably 50% by mass or more, more preferably 75% by mass or more, even more preferably 90% by mass or more, and even more preferably 93% by mass or more, from the viewpoint of inhibition of the shrinkage during curing and lithographic ability. In addition, the content is preferably 99.9% by mass or less, more preferably 99% by mass or less, and even more preferably 98% by mass or less, from the same viewpoint.

As the fine cellulose fibers or a modified product thereof in the resin composition of the present invention, those obtained by the method for production of the present invention can be used, and the content thereof, based on 100 parts by mass of the photo-curable resin precursor, is preferably 0.01 parts by mass or more, more preferably 0.1 parts by mass or more, even more preferably 0.5 parts by mass or more, even more preferably 1.0 part by mass or more, and even more preferably 2.0 parts by mass or more, from the viewpoint of inhibition of the shrinkage during curing, and the content is preferably 20 parts by mass or less, more preferably 15 parts by mass or less, even more preferably 10 parts by mass or less, and even more preferably 7 parts by mass or less, from the viewpoint of the lowering of the viscosities. Here, the content of the fine cellulose fibers refers to an amount converted to fine cellulose fibers in which a modifying group is not introduced.

Also, when the resin composition of the present invention contains a modified product of fine cellulose fibers, the content of the fine cellulose fibers (conversion amount), based on 100 parts by mass of the photo-curable resin precursor, is preferably 0.01 parts by mass or more, more preferably 0.1 parts by mass or more, even more preferably 0.5 parts by mass or more, and even more preferably 0.8 parts by mass or more, from the viewpoint of inhibition of the shrinkage during curing, and the content is preferably 20 parts by mass or less, more preferably 15 parts by mass or less, even more preferably 10 parts by mass or less, and even more preferably 7 parts by mass or less, from the viewpoint of the lowering of the viscosities.

The content of the fine cellulose fibers or a modified product thereof in the resin composition of the present invention is preferably 0.01% by mass or more, more preferably 0.1% by mass or more, even more preferably 0.5% by mass or more, even more preferably 1.0% by mass or more, and even more preferably 2.0% by mass or more, from the viewpoint of inhibition of the shrinkage during curing, and the content is preferably 20% by mass or less, more preferably 15% by mass or less, even more preferably 10% by mass or less, and even more preferably 7% by mass or less, from the viewpoint of the lowering of the viscosities.

In addition, in the resin composition of the present invention, a photopolymerization initiator can be used as other component besides those mentioned above.

The photopolymerization initiator may be a known one, including, for example, acetophenones, benzophenones, ketals, anthraquinones, thioxanthones, azo compounds, peroxides, 2,3-dialkylthione compounds, disulfide compounds, thiuram compounds, fluoroamine compounds, and the like. Here, the content of the photopolymerization initiator may be properly set depending upon the kinds of the photopolymerization initiator to be used.

The resin composition of the present invention can contain, as other components besides those mentioned above, a crystal nucleating agent, a filler including an inorganic filler and an organic filler, a hydrolysis inhibitor, a flame retardant, an antioxidant, a lubricant such as a hydrocarbon wax or an anionic surfactant, an ultraviolet absorbent, an antistatic agent, an anti-clouding agent, a photostabilizer, a pigment, a mildewproof agent, a bactericidal agent, a blowing agent, a surfactant, or the like, within the range that would not impair the effects of the present invention. In addition, other polymeric materials and other resin compositions can be added within the range that would not impair the effects of the present invention. As to the content of the optional additives, the optional additives may be properly contained within the range that would not impair the effects of the present invention, and the content of the optional additives is, for example, preferably 10% by mass or less, and more preferably 5% by mass or less, of the resin composition.

The resin composition of the present invention can be prepared without particular limitations, so long as the resin composition contains a photo-curable resin precursor and fine cellulose fibers or a modified product thereof. For example, the resin composition can be prepared by agitating raw materials containing a photo-curable resin precursor and fine cellulose fibers or a modified product thereof, and further optionally various additives with a Henschel mixer, a ultrasonic homogenizer, a high-pressure homogenizer, or the like, melt-kneading them with a known kneader such as a tightly closed kneader, a single-screw or twin-screw extruder, or an open roller-type kneader, or subjecting them to a solvent cast method. Here, the resin composition may be prepared by optionally adding a solvent (for example, ethanol) to stir, and subsequently removing the solvent. In addition, a dispersion of a polymerizable monomer containing fine cellulose fibers or a modified product thereof may be prepared, and mixed with a photo-curable resin precursor. Here, since the polymerizable monomer allows to progress a curing reaction together with a photo-curable resin, it is also said to be a photo-curable resin precursor.

The resin composition of the present invention is preferably used in the production of a photo-curable three-dimensional modeling product, without being limited thereto, and the resin composition can be used in applications such as resist materials. As a method for producing a photo-curable three-dimensional modeling product, an inkjet ultraviolet curing method (material jetting method) or a stereolithographic method (vat photopolymerization method) has been known. In the inkjet ultraviolet curing method, a liquid resin composition is jetted, and light is then irradiated thereto to cure to allow modeling. On the other hand, in the stereolithographic method, a surface of a pooled liquid resin composition is irradiated with light, and then cured to allow lithography. Accordingly, when the resin composition of the present invention is applied to these methods, it is preferable to use a resin composition having a viscosity in accordance with those methods.

Specifically, when the resin composition of the present invention is used in an inkjet ultraviolet curing method (material jetting method), the viscosity of the resin composition of the present invention at 25° C. is preferably 100 mPa·s or less, more preferably 80 mPa·s or less, even more preferably 60 mPa·s or less, and still even more preferably 50 mPa·s or less, from the viewpoint of improving the jetting from nozzles of an ink cartridge, and from the viewpoint of inhibiting the shrinkage during curing. In addition, the lower limit is, but not particularly limited to, preferably 1 mPa·s or more, from the viewpoint of the lowering of viscosities. In addition, when the resin composition of the present invention is used in a stereolithographic method (vat photopolymerization method), the viscosity of the resin composition of the present invention at 25° C. is preferably 50 mPa·s or more, more preferably 100 mPa·s or more, and even more preferably 200 mPa·s or more, from the viewpoint of stably maintaining a cured product in the resin composition, and the viscosity is preferably 20000 mPa·s or less, more preferably 15000 mPa·s or less, and even more preferably 12000 mPa·s or less, from the viewpoint of handling property. In order to have the viscosity as defined above, in the present invention, for example, if a content of fine cellulose fibers or a modified product thereof is increased, a viscosity can be raised, or if the content is decreased, a viscosity can be lowered. In addition, if an aspect ratio of the fine cellulose fibers used is large, the viscosity can be raised, and if the aspect ratio is small, the viscosity can be lowered. Here, the viscosity as used herein refers to a value measured with a E-type viscometer.

Since the resin composition of the present invention has a low viscosity and excellent inhibition of the shrinkage during curing, the resin composition can be suitably used for manufactured products for precision instruments, electric and electronic manufactured articles, and automobiles, or a part or housing thereof as materials when subjected to three-dimensional modeling. Accordingly, the present invention also provides a method for producing a stereolithographic product, characterized by the use of a resin composition of the present invention (a photo-curable composition of the present invention) in a stereolithographic apparatus.

[Method for Producing Stereolithographic Product]

The method for producing a stereolithographic product of the present invention is not particularly limited so long as a photo-curable composition of the present invention is applied to a stereolithographic apparatus. As the stereolithographic apparatus, a known one can be used, and a stereolithographic product can be prepared by applying a photo-curable composition of the present invention in accordance with the specifications of the apparatus, and irradiating light to the composition in accordance with the field of art. As the light which can be irradiated, ultraviolet rays, electron beams, X-rays, radioactive rays, high frequency, or the like can be used. Here, application of a photo-curable composition and curing by irradiation of light can be repeatedly carried out.

Specifically, for example, when a part or housing is produced by an inkjet method with a photo-curable composition of the present invention, the part or housing can be obtained by filling the above photo-curable composition in a cartridge for an inkjet apparatus, jetting the composition from nozzles in a desired shape, irradiating light thereto to form a layer of cured product, and repeating the above jetting and irradiation of light on the layer to laminate layers of a cured product.

[Stereolithographic Product]

The present invention also provides a stereolithographic product of a photo-curable composition of the present invention. Since the stereolithographic product of a photo-curable composition of the present invention obtained by the method for production of the present invention has an excellent lithographic precision, the stereolithographic product can be suitably used in various applications listed in the above photo-curable composition.

<1> A method for producing shortened anionically modified cellulose fibers having an average fiber length of 1 μm or more and 500 μm or less, the method including cleaving sugar chains of anionically modified cellulose fibers by thermal decomposition under temperature conditions of 50° C. or higher and 230° C. or lower, wherein the average fiber length of the anionically modified cellulose fibers is 700 μm or more and 10000 μm or less.

<2> A method for producing shortened anionically modified cellulose fibers, including cleaving sugar chains of anionically modified cellulose fibers by thermal decomposition under temperature conditions of 50° C. or higher and 230° C. or lower to have an average fiber length of preferably 60% or less, more preferably 50% or less, even more preferably 40% or less, and even more preferably 30% or less of the anionically modified cellulose fibers.

<3> The method for production according to <1> or <2>, wherein the average fiber length of the anionically modified cellulose fibers is 700 μm or more, and 10000 μm or less, preferably 5000 μm or less, and more preferably 3000 μm or less.

<4> The method for production according to <2> or <3>, wherein the average fiber length of the shortened anionically modified cellulose fibers is 1 μm or more and 500 μm or less.

<5> The method for production according to any one of <1> to <4>, wherein the temperature in the sugar chain cleaving step is preferably 60° C. or higher and 220° C. or lower, more preferably 60° C. or higher and 200° C. or lower, more preferably 70° C. or higher and 170° C. or lower, more preferably 70° C. or higher and 110° C. or lower, more preferably 80° C. or higher and 110° C. or lower, more preferably exceeding 80° C. and 110° C. or lower, and more preferably 85° C. or higher and 110° C. or lower.

<6> The method for production according to any one of <1> to <5>, wherein the time in the sugar chain cleaving step is preferably 4 hours or more and 100 hours or less, more preferably 4 hours or more and 50 hours or less, and even more preferably 4 hours or more and 36 hours or less.

<7> The method for production according to any one of <1> to <6>, wherein the pressure in the sugar chain cleaving step is preferably 0.02 MPa or more and 0.25 MPa or less, more preferably 0.04 MPa or more and 0.20 MPa less, and even more preferably 0.08 MPa or more and 0.12 MPa or less.

<8> The method for production according to any one of <1> to <7>, wherein in the sugar chain cleaving step the temperature is 70° C. or higher and 170° C. or lower, the time is 4 hours or more and 50 hours or less, and the pressure is 0.02 MPa or more and 0.25 MPa or less.

<9> The method for production according to any one of <1> to <8>, wherein in the sugar chain cleaving step the temperature is 80° C. or higher and 110° C. or lower, the time is 4 hours or more and 50 hours or less, and the pressure is 0.04 MPa or more and 0.20 MPa or less.

<10> The method for production according to any one of <1> to <9>, wherein in the sugar chain cleaving step the temperature is exceeding 80° C. and 110° C. or lower, the time is 4 hours or more and 36 hours or less, and the pressure is 0.04 MPa or more and 0.20 MPa or less.

<11> The method for production according to any one of <1> to <10>, wherein the amount of the anionic group in the anionically modified cellulose fibers is preferably 0.2 mmol/g or more and 3.0 mmol/g or less, more preferably 0.4 mmol/g or more and 2.7 mmol/g or less, and more preferably 0.4 mmol/g or more and 2.5 mmol/g or less.

<12> The method for production according to any one of <1> to <11>, wherein the anionic group in the anionically modified cellulose fibers is a carboxy group, a sulfonate group, or a phosphate group, and more preferably a carboxy group.

<13> The method for production according to any one of <1> to <12>, wherein the sugar chain cleaving step is carried out under conditions that do not substantially contain an acid, an alkali, or an enzyme.

<14> The method for production according to any one of <1> to <13>, wherein the content of the acid, the alkali, or the enzyme in the sugar chain cleaving step is each 0.01% by mass or less.

<15> The method for production according to any one of <1> to <14>, wherein the sugar chain cleaving step is carried out in a solvent, wherein the content of the anionically modified cellulose fibers in the treatment liquid in the step is 0.1% by mass or more and 80% by mass or less.

<16> The method for production according to any one of <1> to <15>, wherein the solvent is a solvent containing water.

<17> A method for producing modified cellulose fibers, including introducing a modifying group to shortened anionically modified cellulose fibers produced by a method for production as defined in any one of <1> to <16>.

<18> The method for production according to <17>, wherein the above modifying group is an ethylene oxide/propylene oxide (EO/PO) copolymer moiety.

<19> The method for production according to <17> or <18>, wherein in the step of introducing the above modifying group, as the compound for modification, a primary amine, a secondary amine, a tertiary amine, a quaternary ammonium compound, or a phosphonium compound, and preferably a primary amine, is used.

<20> The method for production according to any one of <17> to <19>, wherein the above compound for modification has an ethylene oxide/propylene oxide (EO/PO) copolymer moiety.

<21> A method for producing fine cellulose fibers having an average fiber length of 50 nm or more and 300 nm or less, including subjecting shortened anionically modified cellulose fibers produced by a method for production as defined in any one of <1> to <16>, or modified cellulose fibers produced by a method for production as defined in any one of <17> to <20> to a finely pulverizing treatment.

<22> A method for producing fine cellulose fibers having an average fiber length of 50 nm or more and 300 nm or less, including cleaving sugar chains of anionically modified cellulose fibers having an average fiber length of 400 nm or more and 2000 nm or less by thermal decomposition under temperature conditions of 50° C. or higher and 230° C. or lower.

<23> The method for production according to <22>, wherein the temperature conditions are 70° C. or higher and 170° C. or lower, and wherein the time for the treatment is 4 hours or more and 50 hours or less, and wherein the pressure for the treatment is 0.02 MPa or more and 0.25 MPa or less.

<24> The method for production according to <22> or <23>, wherein the temperature conditions are 80° C. or higher and 110° C. or lower, and wherein the time for the treatment is 4 hours or more and 50 hours or less, and wherein the pressure for the treatment is 0.04 MPa or more and 0.20 MPa or less.

<25> The method for production according to any one of <22> to <24>, wherein the temperature conditions are exceeding 80° C. and 110° C. or lower, and wherein the time for the treatment is 4 hours or more and 36 hours or less, and wherein the pressure for the treatment is 0.04 MPa or more and 0.20 MPa or less.

<26> A method for producing modified cellulose fibers, including introducing a modifying group to fine cellulose fibers produced by a method for production as defined in any one of <22> to <25>.

<27> The method for production according to <26>, wherein the above modifying group is an ethylene oxide/propylene oxide (EO/PO) copolymer moiety.

<28> The method for production according to <26> or <27>, wherein in the step of introducing the above modifying group, as the compound for modification, a primary amine, a secondary amine, a tertiary amine, a quaternary ammonium compound, or a phosphonium compound, and preferably a primary amine, is used.

<29> The method for production according to any one of <26> to <28>, wherein the above compound for modification has an ethylene oxide/propylene oxide (EO/PO) copolymer moiety.

<30> A photo-curable composition containing modified cellulose fibers obtained by a method as defined in any one of <17> to <20>, and <26> to <29>.

<31> A photo-curable composition containing fine cellulose fibers obtained by a method as defined in any one of <21> to <25>.

<32> A composition containing:
(A) modified cellulose fibers obtained by a method as defined in any one of <17> to <20>, and <26> to <29>; and
(B) one or more members selected from monomers and oligomers or resins, having a reactive unsaturated group.

<33> A composition containing:
(C) fine cellulose fibers obtained by a method as defined in any one of
<21> to <25>; and
(B) one or more members selected from monomers and oligomers or resins, having a reactive unsaturated group.

<34> The composition according to <32> or <33>, wherein (B) is one or more members selected from (meth)acrylic monomers, vinyl-based monomers, (meth)acrylates having a bridged cyclohydrocarbon group, and di(meth)acrylates having a bridged cyclohydrocarbon group.

<35> The composition according to any one of <32> to <34>, wherein (B) is one or more members selected from methacrylic acid-based compounds and acrylic acid-based compounds.

<36> The composition according to any one of <32> to <35>, wherein (B) is one or more members selected from (meth)acrylic resins and epoxy-based resins.

<37> A method for producing a lithographic product, including applying a photo-curable composition as defined in <30> or <31> or a composition as defined in any one of <32> to <36> to a stereolithographic apparatus.

<38> A stereolithographic product obtained by a method for production as defined in <37>.

<39> Use of a photo-curable composition as defined in <30> or <31>, a composition as defined in any one of <32> to <36>, or a stereolithographic product obtained by a method for production as defined in <38> as a three-dimensional model.

EXAMPLES

The present invention will be described hereinbelow more specifically by means of the Examples. Here, the Examples are mere exemplifications of the present invention, without intending to limit the present invention thereto. Parts in Examples are parts by mass unless specified otherwise. Here, "ambient pressure" means 101.3 kPa, and "room temperature" means 25° C.

[Average Fiber Diameter and Average Fiber Length of Cellulose Fibers, Anionically Modified Cellulose Fibers, and Shortened Anionically Modified Cellulose Fibers]

Ion-exchanged water is added to cellulose fibers to be measured, to provide a dispersion, a content of which is 0.01% by mass. The dispersion is measured with a wet-dispersion type image analysis particle counter manufactured by JASCO International Co., Ltd. under the trade name of IF-3200, under the conditions of a front lens: 2 folds, telecentric zoom lens: 1 fold, image resolution: 11.185 µm/pixel, syringe inner diameter: 6,515 µm, spacer thickness: 1000 µm, image recognition mode: ghost, threshold: 8, amount of analytical sample: 1 mL, and sampling: 15%. Ten thousands or more cellulose fibers are measured, an average ISO fiber diameter thereof is calculated as an average fiber diameter, and an average ISO fiber length is calculated as an average fiber length.

[Content of Anionic Group of Anionically Modified Cellulose Fibers and Shortened Anionically Modified Cellulose Fibers]

Cellulose fibers to be measured with the mass of 0.5 g on a dry basis are placed in a 100 mL beaker, ion-exchanged water or a mixed solvent of methanol/water=2/1 is added thereto to make up a total volume of 55 mL. Five milliliters of a 0.01 M aqueous sodium chloride solution is added thereto to provide a dispersion. The dispersion is stirred until the cellulose fibers are sufficiently dispersed. A 0.1 M hydrochloric acid is added to this dispersion to adjust its pH to 2.5 to 3, and a 0.05 M aqueous sodium hydroxide solution is added dropwise to the dispersion with an automated titration instrument manufactured by DKK-TOA CORPORATION under the trade name of "AUT-710," under the conditions of a waiting time of 60 seconds. The values of electroconductivity and a pH are measured every minute. The measurements are continued until a pH reaches 11 or so to obtain an electroconductivity curve. A titrated amount of sodium hydroxide is obtained from this electroconductivity curve, and the content of the anionic group of the cellulose fibers to be measured is calculated in accordance with the following formula:

Content of Anionic Group, mmol/g=Titrated Amount of Sodium Hydroxide×Aqueous Sodium Hydroxide Solution Concentration (0.05 M)/Mass of Cellulose Fibers to Be Measured (0.5 g)

[Solid Ingredient Content in Dispersion or Dispersion Liquid]

Using a halogen moisture balance manufactured by Shimadzu Corporation under the trade name of MOC-120H, measurements with a one-gram sample are taken in a thermostat held at 150° C. every 30 seconds, and a value at which a loss of the mass is 0.1% or less is defined as a solid ingredient content.

[Confirmation of Crystal Structure in Shortened Anionically Modified Cellulose Fibers]

The crystal structure of the shortened anionically modified cellulose fibers is confirmed by measuring with an X-ray diffractometer manufactured by Rigaku Corporation under the trade name of "Rigaku RINT 2500VC X-RAY diffractometer" under the following conditions.

The measurement conditions are: X-ray source: Cu/Kα-radiation, tube voltage: 40 kV, tube current: 120 mA, measurement range: diffraction angle 2θ=5° to 45°, and scanning speed of X-ray: 10°/min. A sample for the measurement is prepared by compressing pellets to a size having an area of 320 mm$^2$ and a thickness of 1 mm. Also, the crystallinity of the cellulose I crystal structure is calculated using X-ray diffraction intensity obtained based on the following formula (A):

$$\text{Cellulose } I \text{ Crystallinity},\% = [(I22.6 - I18.5)/I22.6] \times 100 \quad (A)$$

wherein I22.6 is a diffraction intensity of a lattice face (002 face) (angle of diffraction 2θ=22.6°), and I18.5 is a diffraction intensity of an amorphous portion (angle of diffraction 2θ=18.5°), in X-ray diffraction.

[Average Aspect Ratio of Fine Cellulose Fibers]

Here, an average aspect ratio (average fiber length/average fiber diameter) as used herein was measured from a ratio of an average fiber length to an average fiber diameter of fine cellulose fibers with an atomic force microscope (AFM), Nanoscope III Tapping mode AFM, manufactured by Digital Instrument, a probe used being Point Probe (NCH) manufactured by NANOSENSORS.

(Measurement of Warp Coefficient)

When a photo-curable resin is cured on a polyimide film with ultraviolet irradiation, its lithographic product (film) is caused to warp. In order to numerically express the degree of warp, a rectangular test piece of 1×5 cm is cut out with scissors in a direction of warp, and the sample is fixed on a horizontal plane with an adhesive tape up to a point 1 cm away from a left end. The calculation was made from a height (A) of the film at which warp is caused and a distance (B) between a point perpendicularly dropped from its right end and a fixed end (1 cm from the left end of the sample) (FIG. 1).

$$\text{Warp Coefficient} = A/B$$

The measurements were taken using test pieces at three points, and an average value was obtained. At this time, the smaller the warp coefficient, the shrinkage during curing is inhibited, to provide a photo-curable resin having a high three-dimensional modeling precision.

[Preparation of Anionically Modified Cellulose Fibers]

Preparation Example 1—Broad-Leaf Oxidized Pulp

Broad-leaf bleached kraft pulp derived from eucalyptus manufactured by CENIBRA was used as natural cellulose fibers. As TEMPO, a commercially available product manufactured by ALDRICH, Free radical, 98% by mass, was used. As sodium hypochlorite, a commercially available product manufactured by Wako Pure Chemical Industries, Ltd. was used. As sodium bromide, a commercially available product manufactured by Wako Pure Chemical Industries, Ltd. was used.

First, 100 g of the broad-leaf bleached kraft pulp fibers were sufficiently stirred in 9,900 g of ion-exchanged water, and 1.6 g of TEMPO, 10 g of sodium bromide, and 28.4 g of sodium hypochlorite were added in that order to 100 g of the mass of the pulp. Using a pH stud titration with an automated titration instrument manufactured by DKK-TOA CORPORATION under the trade name of "AUT-701," a 0.5 M sodium hydroxide was added dropwise thereto to keep a pH at 10.5. After the reaction was carried out at 20° C. for 30 minutes, the dropwise addition of sodium hydroxide was stopped, to provide oxidized cellulose fibers. Diluted hydrochloric acid was added to the oxidized cellulose fibers obtained so that the counterions were converted from sodium ions to protons. Thereafter, the protonated cellulose fibers were sufficiently washed with ion-exchanged water, and subsequently subjected to a dehydration treatment, to provide oxidized cellulose fibers having a solid ingredient of 25.7%. The resulting oxidized cellulose fibers had an average fiber diameter of 39 µm, an average fiber length of 1003 µm, and a content of carboxy group of 1.0 mmol/g.

Preparation Example 2—Broad-Leaf Oxidized Pulp, with Reducing Treatment

Ten grams of absolutely dried oxidized cellulose obtained in Preparation Example 1 was sufficiently stirred in 490 g of ion-exchanged water, and a 2 M aqueous sodium hydroxide solution was then added thereto to adjust its pH to 10. Thereafter, 2 g of sodium borohydride was added thereto, with stirring for 3 hours, and a 1 M hydrochloric acid was then added thereto to adjust its pH to 3. The oxidized cellulose fibers obtained were sufficiently washed with ion-exchanged water, and subsequently subjected to a dehydration treatment, to provide oxidized cellulose fibers that were subjected to a reducing treatment having a solid ingredient of 27.6%. The resulting oxidized cellulose fibers had an average fiber diameter of 50 µm, an average fiber length of 844 µm, and a content of carboxy group of 1.0 mmol/g.

Preparation Example 3—Broad-Leaf Oxidized Pulp, with High Content of Carboxy Group The same procedures as in Preparation Example 1 were carried out except that the amount of sodium hypochlorite used was changed to 38.9 g, and that the reaction time was changed to 120 minutes, to provide oxidized cellulose fibers having a solid ingredient of 19.6%. The resulting oxidized cellulose fibers had an average fiber diameter of 60 µm, an average fiber length of 808 µm, and a content of carboxy group of 1.6 mmol/g.

Preparation Example 4—Needle-Leaf Fine Cellulose Fibers

Needle-leaf bleached kraft pulp manufactured by West Fraser, under the trade name of Hinton was used as natural cellulose fibers. As TEMPO, a commercially available product manufactured by ALDRICH, Free radical, 98% by mass, was used. As sodium hypochlorite and sodium bromide, the commercially available products were used.

First, 100 g of the above bleached kraft pulp fibers were sufficiently stirred in 9,900 g of ion-exchanged water, and 1.6 g of TEMPO, 10 g of sodium bromide, and 28.4 g of sodium hypochlorite were added in that order to 100 g of the pulp fibers. Using a pH stud titration with an automated titration instrument manufactured by DKK-TOA CORPORATION under the trade name of "AUT-701," a 0.5 M aqueous sodium hydroxide solution was added dropwise thereto to keep a pH at 10.5. The reaction was carried out at 20° C. for 120 minutes. The dropwise addition of the aqueous sodium hydroxide solution was stopped, and the obtained cake was sufficiently washed with ion-exchanged water, and subsequently subjected to a dehydration treatment, to provide oxidized pulp having a solid ingredient content of 34.6% by mass.

The amount 1.04 g of the oxidized pulp thus obtained and 34.8 g of ion-exchanged water were mixed, and the oxidized pulp was subjected to a finely pulverizing treatment 10 times at 150 MPa with a high-pressure homogenizer, to produce a dispersion of anionically modified cellulose fibers in an Na salt form, containing a carboxy group as an anionic group, a solid ingredient content of which was 1.0% by mass. The resulting fine anionically modified cellulose fibers had an average fiber diameter of 2.7 nm, an average fiber length of 594 nm, and a content of carboxy group of 1.6 mmol/g.

Example 1

[Preparation of Shortened Anionically Modified Cellulose Fibers]

A vial jar equipped with a magnetic stirrer and a stirring bar was charged with anionically modified cellulose fibers obtained in Preparation Example 1 in an amount of 0.72 g on absolutely dry mass basis, and ion-exchange water was added thereto until the mass of the treatment liquid reached 36 g. The pH of this treatment liquid was 3.9. The treatment liquid was reacted at 90° C. under an ambient pressure for 6 hours, to provide an aqueous suspension of shortened anionically modified cellulose fibers. The resulting shortened anionically modified cellulose fibers had an average fiber length of 249 μm, and an average fiber diameter of 37 μm. Also, the resulting shortened anionically modified cellulose fibers had a cellulose I crystallinity of 77%.

Examples 2 and 3

The same procedures as in Example 1 were carried out except that anionically modified cellulose fibers obtained in Preparation Example 2 and Preparation Example 3 were used, to provide an aqueous suspension of shortened anionically modified cellulose fibers.

Examples 4 to 8

The same procedures as in Example 1 were carried out except that the conditions listed in Table 1 were taken, to provide an aqueous suspension of shortened anionically modified cellulose fibers (DMF suspension in Example 8). The optical photomicrographs showing the states of cellulose fibers before and after the thermal decomposition treatment in Example 4 are shown in FIG. 2. The left panel in FIG. 2 shows one before the thermal decomposition treatment, and the right panel shows one after the thermal decomposition treatment. It can be seen from the right panel that the cellulose fibers after the thermal decomposition treatment were shortened while maintaining a fibrous state without being aggregated to each other.

Example 9

The same procedures as in Examples 4 to 6 were carried out except that anionically modified cellulose fibers obtained in Preparation Example 1 were lyophilized and used, and that a solvent was not used, to provide shortened anionically modified cellulose fibers.

Example 10

The same procedures as in Example 4 were carried out except that anionically modified cellulose fibers were used in the state of sodium ions without converting the counterions to protons in Preparation Example 1, to provide an aqueous suspension of shortened anionically modified cellulose fibers. The pH of the treatment liquid at this time was 7.0.

Example 11

[Preparation of Shortened Fine Anionically Modified Cellulose Fibers]

A vial jar equipped with a magnetic stirrer and a stirring bar was charged with fine anionically modified cellulose fibers obtained in Preparation Example 4 in an amount 0.05 g on absolutely dry mass basis, and a pH of this treatment liquid was 8.6. The treatment liquid was reacted at 90° C. for 24 hours, to provide an aqueous dispersion of shortened fine anionically modified cellulose fibers. The resulting shortened fine anionically modified cellulose fibers had an average fiber length of 2.1 nm, and an average fiber diameter of 166 nm. The resulting shortened fine anionically modified cellulose fibers had a cellulose I crystallinity of 77%.

Comparative Example 1

The same procedures as in Example 1 were carried out except that broad-leaf bleached kraft pulp manufactured by CENIBRA was used in place of anionically modified cellulose fibers, to provide an aqueous suspension of cellulose fibers. The pH of the treatment liquid was 7.1.

TABLE 1

| | | Ex. | | | | | | | | | | | Comp. Ex. |
|---|---|---|---|---|---|---|---|---|---|---|---|---|---|
| | | 1 | 2 | 3 | 4 | 5 | 6 | 7 | 8 | 9 | 10 | 11 | 1 |
| Anionically Modified Cellulose Fibers | Anionic Group | | | | | Carboxy group | | | | | | | None |
| | Content of Anionic Group, mmol/g | 1.0 | 1.0 | 1.6 | 1.0 | 1.0 | 1.0 | 1.0 | 1.0 | 1.0 | 1.0 | 1.6 | — |
| | Average Fiber Length, μm | 1003 | 844 | 808 | 1003 | 1003 | 1003 | 1003 | 1003 | 1003 | 1003 | 0.594 | 1256 |
| Solvent | | Water | Water | Water | Water | Water | Water | Water | DMF | — | Water | Water | Water |
| Cellulose Concentration in Treatment Liquid, wt % | | 2 | 2 | 2 | 2 | 10 | 30 | 2 | 2 | — | 2 | 0.25 | 2 |
| Time for Treatment, h | | 6 | 24 | 6 | 24 | 24 | 24 | 24 | 6 | 24 | 24 | 24 | 6 |
| Temperature for Treatment, ° C. | | 90 | 90 | 90 | 90 | 90 | 90 | 65 | 90 | 90 | 90 | 90 | 90 |
| pH, Before Heat Treatment | | 3.9 | 3.8 | 5.4 | 3.9 | 3.9 | — | 3.9 | — | — | 7.0 | 8.6 | 7.1 |
| pH, After Heat Treatment | | 3.4 | 2.7 | — | 3.3 | — | — | — | — | — | 5.8 | — | 5.4 |
| Reducing Treatment | | Absent | Present | Absent | Absent | Absent | Absent | Absent | Absent | Absent | Absent | Absent | Absent |
| Shortened Anionically Modified Cellulose Fibers | Average Fiber Length, μm | 249 | 358 | 157 | 93 | 115 | 88 | 492 | 243 | 368 | 93 | 0.166 | 1248 |

It could be seen from Table 1 that according to the present invention, the shortening of fibers progressed by hydrothermal treatment alone without using an acid or the like by selecting one containing an anionic group as cellulose fibers to be subject to sugar chain cleaving. In addition, it could be seen from Examples 8 and 9 that the shortening of fibers progressed in the same manner even in a case where DMF was used or a case where the cellulose fibers in a dry state were used.

On the other hand, as shown in Comparative Example 1, it could be seen that in a case where of cellulose fibers to be subjected to shortening without containing an anionic group, sufficient shortening of fibers did not progress.

Preparation Example 5 of Carboxy Group-Containing Cellulose Fibers—Dispersion of Carboxy Group-Containing (Shortened) Fine Cellulose Fibers Obtained by Treating Natural Cellulose with N-Oxyl Compound Needle-leaf bleached kraft pulp manufactured by Fletcher Challenge Canada Ltd., under the trade name of "Machenzie," CSF 650 ml, was used as natural cellulose fibers. As TEMPO, a commercially available product manufactured by ALDRICH, Free radical, 98% by mass, was used. As sodium hypochlorite, a commercially available product manufactured by Wako Pure Chemical Industries, Ltd. was used. As sodium bromide, a commercially available product manufactured by Wako Pure Chemical Industries, Ltd. was used.

First, 100 g of the needle-leaf bleached kraft pulp fibers were sufficiently stirred in 9,900 g of ion-exchanged water, and 1.25 g of TEMPO, 12.5 g of sodium bromide, and 34.2 g of sodium hypochlorite were added in that order to 100 g of the mass of the pulp. Using a pH stud, a 0.5 M sodium hydroxide was added dropwise thereto to keep a pH at 10.5. After the reaction was carried out at 20° C. for 120 minutes, the dropwise addition of sodium hydroxide was stopped, to provide oxidized pulp. The oxidized pulp obtained was sufficiently washed with ion-exchanged water, and subsequently subjected to a dehydration treatment. Ten grams of the (absolutely dried) oxidized pulp obtained was sufficiently stirred in 490 g of ion-exchanged water, and a 2 M aqueous sodium hydroxide solution was then added thereto to adjust its pH to 10. Thereafter, 2 g of sodium borohydride was added thereto and stirred for 3 hours, and 1 M hydrochloric acid was then added thereto to adjust its pH to 3. The oxidized cellulose fibers obtained were sufficiently washed with ion-exchanged water, and subsequently subjected to a dehydration treatment, to provide carboxy group-containing cellulose fibers that were subjected to a reducing treatment, a solid ingredient content of which was 27.6%. The resulting oxidized cellulose fibers had a content of carboxy group of 1.3 mmol/g.

[Preparation of Shortened Carboxy Group-Containing Cellulose Fibers]

A vial jar equipped with a magnetic stirrer and a stirring bar was charged with carboxy group-containing cellulose fibers obtained in an amount of 0.72 g on absolutely dry mass basis, and ion-exchanged water was added to make up the mass of the treatment liquid of 36 g. The treatment liquid was reacted at 95° C. for 24 hours, to provide an aqueous suspension of shortened carboxy group-containing cellulose fibers of Preparation Example 1. The resulting shortened carboxy group-containing cellulose fibers had an average aspect ratio after the finely pulverizing treatment of 37. The resulting shortened carboxy group-containing cellulose fibers had a cellulose I crystallinity of 77%.

Preparation Example 6 of Carboxy Group-Containing Cellulose Fibers—Dispersion of Carboxy Group-Containing (Lengthened) Fine Cellulose Fibers The oxidization reaction was carried out under the same conditions as Preparation Example 1 except that sodium hypochlorite was changed to 28.4 g, to provide oxidized pulp. Ten grams of the (absolutely dried) oxidized pulp obtained was sufficiently stirred in 490 g of ion-exchanged water, and a 2 M aqueous sodium hydroxide solution was then added thereto to adjust its pH to 10. Thereafter, 2 g of sodium borohydride was added thereto and stirred for 3 hours, and 1 M hydrochloric acid was then added thereto to adjust its pH to 3. The oxidized cellulose fibers obtained were sufficiently washed with ion-exchanged water, and subsequently subjected to a dehydration treatment, to provide oxidized cellulose fibers that were subjected to a reducing treatment, a solid ingredient content of which was 27.6%. The resulting oxidized cellulose fibers had a content of carboxy group of 1.6 mmol/g, and an average aspect ratio after the finely pulverizing treatment of 235.

Production Example 1 of Cellulose Fiber Composite (Example 12)

(Solvent Substitution)

An aqueous dispersion of shortened carboxy group-containing cellulose fibers obtained in Preparation Example 5 and ethanol were mixed in a centrifuge tube while stirring. At this time, the aqueous dispersion of carboxy group-containing cellulose fibers was adjusted to be 0.5 g on a dry weight basis. After sufficient stirring, the dispersion was subjected to centrifugation (High-Speed Refrigerated Centrifuge CR22N, manufactured by Hitachi Limited) at 10000 rpm for 1 minute, to precipitate carboxy group-containing cellulose fibers. The supernatant was removed, and ethanol was then supplied into the centrifuge tube again to sufficiently mix the carboxy group-containing cellulose fibers and ethanol. The centrifugation was carried out under the above conditions. The above procedures were then repeated three times, to provide an ethanol dispersion of carboxy group-containing cellulose fibers.

A beaker equipped with a magnetic stirrer and a stirring bar was charged with 4.05 g of an ethanol dispersion of carboxy group-containing fine cellulose fibers mentioned above, a solid ingredient concentration of which was 12.4% by mass. Subsequently, 1.16 g of Jeffamine M-2070, manufactured by HUNTSMAN, having an EO/PO molar ratio of 32/10, a molecular weight of 2000 was added thereto, and a mixture was stirred at room temperature for 24 hours, to provide an ethanol dispersion of a cellulose fiber composite linked to the EOPO group, in which the amine was bonded to the carboxy-containing cellulose fibers via an ionic bonding.

Production Example 2 of Cellulose Fiber Composite (Comparative Example 2)

The aqueous dispersion of carboxy group-containing cellulose fibers obtained in Preparation Example 6 was subjected to solvent substitution with ethanol in the same manner as in Production Example 1. Subsequently, a beaker equipped with a magnetic stirrer and a stirring bar was charged with 5.8 g of an ethanol dispersion of carboxy group-containing fine cellulose fibers mentioned above, a solid ingredient concentration of which was 3.8% by mass. Subsequently, 0.59 g of Jeffamine M-2070, manufactured by HUNTSMAN, having an EO/PO molar ratio of 32/10, a molecular weight of 2000 was added thereto, and a mixture was stirred at room temperature for 24 hours, to provide an ethanol dispersion of a cellulose fiber composite linked to the EOPO group, in which the amine was bonded to the carboxy group-containing cellulose fibers via an ionic bonding.

Example 12

<Finely Pulverizing Treatment and Preparation of Dispersion of Monomer>

Isobornyl acrylate was added in an amount of 22.3 g to an ethanol dispersion of a cellulose fiber composite obtained in Production Example 5, and a mixture was mixed. This liquid mixture was subjected five times to a finely pulverizing treatment with a high-pressure homogenizer manufactured by Sugino Machine Limited, Starburstlabo HJP-2 5005 at 150 MPa, to provide a dispersion of fine cellulose fiber composite. Subsequently, ethanol was distilled away from the above dispersion with an evaporator under the conditions of 60° C. and a reduced pressure over 2 hours. The dispersion obtained was dried under the conditions of 130° C. and 200 to 300 Pa for 1 hour to obtain its concentration. As a result, the content of the fine cellulose fiber composite (conversion amount) was 2.0% by mass.

<Production of Photo-Curable Resin>

The amount 5.0 g (100 parts by mass) of AR-M2 manufactured by KEYENCE, an acrylic resin composition precursor as a photo-curable resin precursor, 5.0 g of a dispersion of a fine cellulose fiber composite (content of fine cellulose fiber composite (conversion amount)=2.0% by mass) mentioned above, and 0.5 g of isobornyl acrylate (IBXA) were added, and a mixture was mixed with stirring, to provide a transparent photo-curable composition. Here, the viscosity was analyzed using a viscometer Viscometer TV-35 and a temperature-controlling unit ViscomateVM-150III, each manufactured by TOKI SANGYO CO., LTD., under the conditions of a measurement temperature of 25° C., a measurement time of 1 minute, and a rotational speed of 1 rpm.

<Curing of Acrylic Resin Composition>

A photo-curable composition obtained was uniformly applied in a thickness of about 0.4 mm to a polyimide film fixed on a glass plate with an adhesive tape at four corners using a bar coater, and a resin was then cured with a UV irradiation apparatus EYE INVERTOR GRANDAGE (4 kW), manufactured by EYE GRAPHICS CO., LTD., under the conditions of a belt speed of 60 cm/min, an irradiation intensity of 100 mW/cm$^2$, and an irradiated amount of 7000 mJ/cm$^2$, to provide a stereolithographic product of an acrylic resin composition containing 0.9 parts by mass (conversion amount) of the fine cellulose fiber composite.

Comparative Example 2

<Finely Pulverizing Treatment and Preparation of Dispersion of Monomer>

Isobornyl acrylate was added in an amount of 37.7 g to an ethanol dispersion of a cellulose fiber composite obtained in Production Example 6, and a mixture was mixed. Ethanol was distilled away from this liquid mixture with an evaporator under the conditions of 60° C. and a reduced pressure over 2 hours. Subsequently, this liquid mixture was subjected five times to a finely pulverizing treatment with a high-pressure homogenizer manufactured by Sugino Machine Limited, Starburstlabo HJP-2 5005 at 150 MPa, to provide a gel-like dispersion of fine cellulose fibers. The fine cellulose dispersion obtained was dried under the conditions of 130° C. and 200 to 300 Pa for 1 hour to obtain its concentration. As a result, the content of the fine cellulose fiber composite (conversion amount) was 0.5% by mass. However, since the dispersion was in gel-like form and the lowering of viscosity could not be achieved, the subsequent production of a photo-curable resin was not carried out.

Comparative Example 3

A photo-curable composition and a stereolithographic product of the composition were produced in the same manner as in Example 12 except that the fine cellulose fiber composite was not used, and their viscosities and warp coefficients were obtained. The components and a viscosity of the photo-curable composition and a warp coefficient were summarized in Table 2.

TABLE 2

| | | Ex. 12 | Comp. Ex. 2 | Comp. Ex. 3 |
|---|---|---|---|---|
| Fine Cellulose Fiber Composite | Production Example | 1 | 2 | Unused |
| | Aspect Ratio | 37 | 235 | — |
| | Modifying Group | EOPO | EOPO | — |
| | Content of Carboxy Group Before Modification, mmol/g | 1.3 | 1.6 | — |
| Dispersion of Monomer | Content of Fine Cellulose Fiber Composite, conversion amount, % by mass | 2.0 | 0.5 | — |
| | Viscosity, mPa · s/ 1 rpm | 21 | Gelated | — |
| Photo-Curable Composition | AR-M2, parts by mass | 5.0 | — | 5.0 |
| | Dispersion of Monomer, arts by mass | 5.0 | — | 0 |
| | IBXA, parts by mass | 0.5 | — | 0 |
| | Concentration of Fine Cellulose, Conversion to Unmodified Fine Cellulose, % by mass | 0.95 | — | 0 |
| | Viscosity, mPa · s | 26 | — | 32 |
| Stereolithographic Product | Warp Coefficient | 0.08 | — | 0.81 |

As shown in Table 2, the photo-curable composition of Example 12 containing a fine cellulose fiber composite having a low aspect ratio had a lower viscosity, more excellent jetting property, and a lower warp coefficient, as compared to those of Comparative Example 3 without containing the fine cellulose fiber composite, so that its stereolithographic product after curing also had an excellent lithographic precision. On the other hand, Comparative Example 2 in which a fine cellulose fiber composite not having a low aspect ratio was used was undesirably gelated, so that a photo-curable composition could not be prepared.

INDUSTRIAL APPLICABILITY

By the use of shortened anionically modified cellulose fibers or the like obtained by the method for production of the present invention, a dispersion containing fine cellulose fibers having a low viscosity and excellent handling property can be prepared while at a high concentration, so that the dispersion can be suitably used in various industrial applications such as daily sundries, household electric appliance parts, packaging materials for household electric appliances, automobile parts, and materials for three-dimensional modeling.

The invention claimed is:

1. A method for producing shortened anionically modified cellulose fibers having an average fiber length of 1 μm or more and 500 μm or less, the method comprising cleaving sugar chains of anionically modified cellulose fibers by thermal decomposition under temperature conditions of 50° C. or higher and 230° C. or lower, wherein the average fiber length of the anionically modified cellulose fibers is 700 μm or more and 10000 μm or less,
wherein the sugar chain cleaving step is carried out under conditions that do not contain an acid, an alkali, or an enzyme.

2. The method for production according to claim 1, wherein the amount of the anionic group in the anionically modified cellulose fibers is 0.2 mmol/g or more.

3. The method for production according to claim 1, wherein the anionic group in the anionically modified cellulose fibers is a carboxy group.

4. The method for production according to claim 1, wherein the sugar chain cleaving step is carried out in a solvent, and wherein the content of the anionically modified cellulose fibers of a treatment liquid in the step is 0.1% by mass or more and 80% by mass or less.

5. The method for production according to claim 4, wherein the solvent is a solvent comprising water as the solvent, and wherein the sugar chain cleaving step is carried out under temperature conditions of 60° C. or higher and 110° C. or lower.

6. A method for producing modified cellulose fibers, comprising introducing a modifying group to shortened anionically modified cellulose fibers produced by a method for production as defined in claim 1.

7. The method for producing modified cellulose fibers according to claim 6, wherein the modifying group is an ethylene oxide/propylene oxide (EO/PO) copolymer moiety.

8. A method for producing fine cellulose fibers having an average fiber length of 50 nm or more and 300 nm or less, comprising subjecting shortened anionically modified cellulose fibers produced by a method for production as defined in claim 1, or modified cellulose fibers produced by a method for production comprising introducing a modifying group to shortened anionically modified cellulose fibers produced by a method for production as defined in claim 1, to a finely pulverizing treatment.

9. A method for producing fine cellulose fibers having an average fiber length of 50 nm or more and 300 nm or less, comprising cleaving sugar chains of anionically modified cellulose fibers having an average fiber length of 400 nm or more and 2000 nm or less by thermal decomposition under temperature conditions of 50° C. or higher and 230° C. or lower,
wherein the sugar chain cleaving step is carried out under conditions that do not contain an acid, an alkali, or an enzyme.

10. The method for production according to claim 9, wherein the sugar chain cleaving step is carried out under temperature conditions of 80° C. or higher and 100° C. or lower at an ambient pressure.

11. A photo-curable composition comprising modified cellulose fibers obtained by a method as defined in claim 6.

12. A photo-curable composition comprising fine cellulose fibers obtained by a method as defined in claim 8.

13. A method for producing a stereolithographic product, comprising applying a photo-curable composition as defined in claim 11 to a stereolithographic apparatus.

14. A stereolithographic product obtained by a method for production as defined in claim 13.

15. The method for production according to claim 4, wherein the solvent is one or more members selected from water, N,N-dimethylformamide (DMF), ethanol, isopropanol (IPA), methyl ethyl ketone (MEK), ethyl acetate, toluene, and cyclohexanone.

16. The method for production according to claim 4, wherein the solvent comprises water in an amount of 50% by mass or more.

17. The method for production according to claim 4, wherein the solvent comprises water in an amount of 80% by mass or more.

18. The method for production according to claim 1, wherein the average fiber length of the anionically modified cellulose fibers is 700 μm or more and 3000 μm or less.

19. The method for production according to claim 1, wherein the average fiber length of the shortened anionically modified cellulose fibers is 10 μm or more and 400 μm or less.

20. The method for production according to claim 1, wherein the sugar chain cleaving step is carried out under temperature conditions of 60° C. or higher and 100° C. or lower.

21. A method for producing shortened anionically modified cellulose fibers having an average fiber length of 1 μm or more and 500 μm or less, the method comprising cleaving sugar chains of anionically modified cellulose fibers by thermal decomposition under temperature conditions of 50° C. or higher and 230° C. or lower, wherein the average fiber length of the anionically modified cellulose fibers is 700 μm or more and 10000 μm or less,
wherein the sugar chain cleaving step is carried out under conditions that do not contain an acid, an alkali, or an enzyme;
wherein the time in the sugar chain cleaving step is 4 hours or more.

22. A method for producing shortened anionically modified cellulose fibers having an average fiber length of 1 μm or more and 500 μm or less, the method comprising cleaving sugar chains of anionically modified cellulose fibers by thermal decomposition under temperature conditions of 70° C. or higher and 100° C. or lower, wherein the average fiber length of the anionically modified cellulose fibers is 700 μm or more and 10000 μm or less,
wherein the sugar chain cleaving step is carried out under conditions that do not contain an acid, an alkali, or an enzyme.

* * * * *